(12) United States Patent
Rendusara et al.

(10) Patent No.: US 9,985,690 B2
(45) Date of Patent: May 29, 2018

(54) TELEMETRY EQUIPMENT FOR MULTIPHASE ELECTRIC MOTOR SYSTEMS

(71) Applicant: Schlumberger Technology Corporation, Sugar Land, TX (US)

(72) Inventors: Dudi Rendusara, Singapore (SG); Fraz Ahmad Kharal, Singapore (SG)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 40 days.

(21) Appl. No.: 14/765,543

(22) PCT Filed: Jan. 30, 2014

(86) PCT No.: PCT/US2014/013702
§ 371 (c)(1),
(2) Date: Aug. 3, 2015

(87) PCT Pub. No.: WO2014/120847
PCT Pub. Date: Aug. 7, 2014

(65) Prior Publication Data
US 2016/0006481 A1    Jan. 7, 2016

Related U.S. Application Data

(60) Provisional application No. 61/760,057, filed on Feb. 2, 2013.

(51) Int. Cl.
*H04B 3/54* (2006.01)
*F04D 13/08* (2006.01)
(Continued)

(52) U.S. Cl.
CPC .......... *H04B 3/546* (2013.01); *E21B 43/128* (2013.01); *E21B 47/122* (2013.01); *F04D 1/06* (2013.01);
(Continued)

(58) Field of Classification Search
CPC .. E21B 43/122; E21B 43/128; E21B 47/0007; E21B 47/12; F04D 1/06;
(Continued)

(56) References Cited

U.S. PATENT DOCUMENTS

| 4,311,194 A | 1/1982 | White |
| 5,069,488 A | 12/1991 | Freyer et al. |

(Continued)

FOREIGN PATENT DOCUMENTS

| GB | 2355167 A | 4/2001 |
| GB | 2442892 A | 4/2008 |

(Continued)

OTHER PUBLICATIONS

European Search Report issued in related EP application 14745750.1 dated Aug. 1, 2016, 4 pages.

(Continued)

*Primary Examiner* — Quan-Zhen Wang
*Assistant Examiner* — Stephen Burgdorf

(57) ABSTRACT

An electric submersible pump system can include a multiphase electric motor operatively coupled to a fluid pump where the multiphase motor includes a wye point; telemetry circuitry operatively coupled to the wye point where the telemetry circuitry generates AC telemetry signals; a multiphase power cable operatively coupled to the multiphase electric motor; and a tune filter operatively coupled to the multiphase power cable where the tune filter passes and amplifies AC telemetry signals generated by the telemetry circuitry, the AC telemetry signals being transmitted to the (Continued)

multiphase power cable via the wye point. Various other apparatuses, systems, methods, etc., are also disclosed.

15 Claims, 22 Drawing Sheets

(51) Int. Cl.
| | |
|---|---|
| F04D 27/00 | (2006.01) |
| F04D 1/06 | (2006.01) |
| F04D 13/10 | (2006.01) |
| F04D 15/00 | (2006.01) |
| E21B 43/12 | (2006.01) |
| E21B 47/12 | (2012.01) |

(52) U.S. Cl.
CPC ............. *F04D 13/08* (2013.01); *F04D 13/10* (2013.01); *F04D 15/0088* (2013.01); *F04D 27/00* (2013.01); *H04B 3/542* (2013.01); *H04B 2203/5475* (2013.01)

(58) Field of Classification Search
CPC ...... F04D 13/08; F04D 13/10; F04D 15/0088; F04D 27/00; G01V 11/002; H04B 3/54; H04B 3/542; H04B 3/546; H04B 2203/5475
USPC ...................................................... 340/854.9
See application file for complete search history.

(56) References Cited

U.S. PATENT DOCUMENTS

| | | | |
|---|---|---|---|
| 5,521,592 A | 5/1996 | Veneruso | |
| 6,396,415 B1* | 5/2002 | Bulmer | E21B 47/122 340/855.4 |
| 6,587,037 B1* | 7/2003 | Besser | E21B 43/128 340/538.11 |
| 7,531,922 B1* | 5/2009 | Olson | H05B 37/0263 307/157 |
| 7,982,633 B2* | 7/2011 | Booker | H04B 3/54 340/853.3 |
| 8,138,622 B2* | 3/2012 | Layton | G01V 11/002 307/3 |
| 8,149,552 B1* | 4/2012 | Cordill | E21B 43/128 361/42 |
| 2003/0025612 A1 | 2/2003 | Holmes et al. | |
| 2003/0156014 A1* | 8/2003 | Kodama | H04B 3/54 375/258 |
| 2006/0102341 A1 | 5/2006 | Freer et al. | |
| 2009/0078430 A1 | 3/2009 | Du | |
| 2009/0139726 A1 | 6/2009 | Gomez | |
| 2010/0194585 A1* | 8/2010 | Skinner | E21B 43/128 340/853.2 |
| 2010/0282474 A1 | 11/2010 | Mohr | |
| 2012/0026003 A1 | 2/2012 | Layton et al. | |
| 2012/0037354 A1 | 2/2012 | McCoy et al. | |

FOREIGN PATENT DOCUMENTS

| | | |
|---|---|---|
| RU | 2230187 C2 | 6/2004 |
| RU | 2325032 C1 | 5/2008 |

OTHER PUBLICATIONS

EP Article 94(3) issued in related EP application 14745750.1 dated Aug. 18, 2016, 5 pages.
Decision to Grant issued in related RU application 2015136977 dated Sep. 2, 2016, 18 pages.
International Search Report and Written Opinion for corresponding PCT Application No. PCT/US2014/013702 dated May 15, 2014, 11 pages.
International Preliminary Report on Patentability for corresponding PCT Application No. PCT/US2014/013702 dated Aug. 13, 2015, 8 pages.
International Search Report and Written Opinion for corresponding PCT Application No. PCT/US2013/072949 dated Mar. 14, 2014, 12 pages.
International Preliminary Report on Patentability for corresponding PCT Application No. PCT/US2013/072949 dated Jun. 18, 2015, 9 pages.

\* cited by examiner

System 600

TELEMETRY EQUIPMENT FOR MULTIPHASE ELECTRIC MOTOR SYSTEMS

RELATED APPLICATIONS

This application claims the benefit of and priority to U.S. Provisional Application Ser. No. 61/760,057, filed 2 Feb. 2013, which is incorporated by reference herein.

BACKGROUND

Artificial lift equipment such as electric submersible pumps (ESPs) may be deployed for any of a variety of pumping purposes. For example, where a substance does not readily flow responsive to existing natural forces, an ESP may be implemented to artificially lift the substance. To receive power to power an electric motor, an ESP is connected to a cable or cables, which are, in turn, connected to a power drive. In some instances, an ESP may be deployed with one or more sensors (e.g., a gauge or gauges). Communication of information with ESP equipment may occur via a power cable, which may, depending on type of deployment, be of a length of the order of hundreds of meters or more. Various technologies, techniques, etc., described herein pertain to circuitry, for example, communication circuitry, circuitry that may facilitate communication, etc.

SUMMARY

An electric submersible pump system can include a multiphase electric motor operatively coupled to a fluid pump where the multiphase motor includes a wye point; telemetry circuitry operatively coupled to the wye point where the telemetry circuitry generates AC telemetry signals; a multiphase power cable operatively coupled to the multiphase electric motor; and a tune filter operatively coupled to the multiphase power cable where the tune filter passes and amplifies AC telemetry signals generated by the telemetry circuitry, the AC telemetry signals being transmitted to the multiphase power cable via the wye point. An electric submersible pump system can include a multiphase electric motor operatively coupled to a fluid pump where the multiphase motor includes a wye point; a multiphase power cable operatively coupled to the multiphase electric motor; a tune filter operatively coupled to the multiphase power cable where the tune filter passes and amplifies a frequency band of signals transmitted to the multiphase power cable via the wye point; and a line trap operatively coupled to the multiphase power cable where the line trap attenuates noise in the frequency band and where the line trap filter includes an impedance that mitigates loss of the frequency band of signals for a ground fault state of the system. An electric submersible pump system can include a multiphase electric motor operatively coupled to a fluid pump where the multiphase electric motor includes a wye point; a multiphase power cable operatively coupled to the multiphase electric motor; telemetry circuitry operatively coupled to the wye point; and unbalance circuitry coupled to the telemetry circuitry and to the multiphase power cable to unbalance the wye point according to a telemetric protocol. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
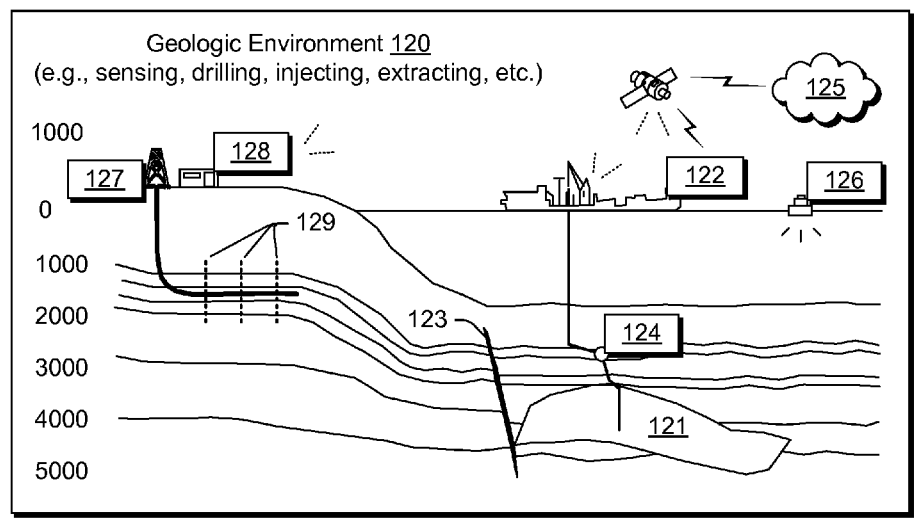
FIG. 1 illustrates examples of equipment in geologic environments.
Figure 1:
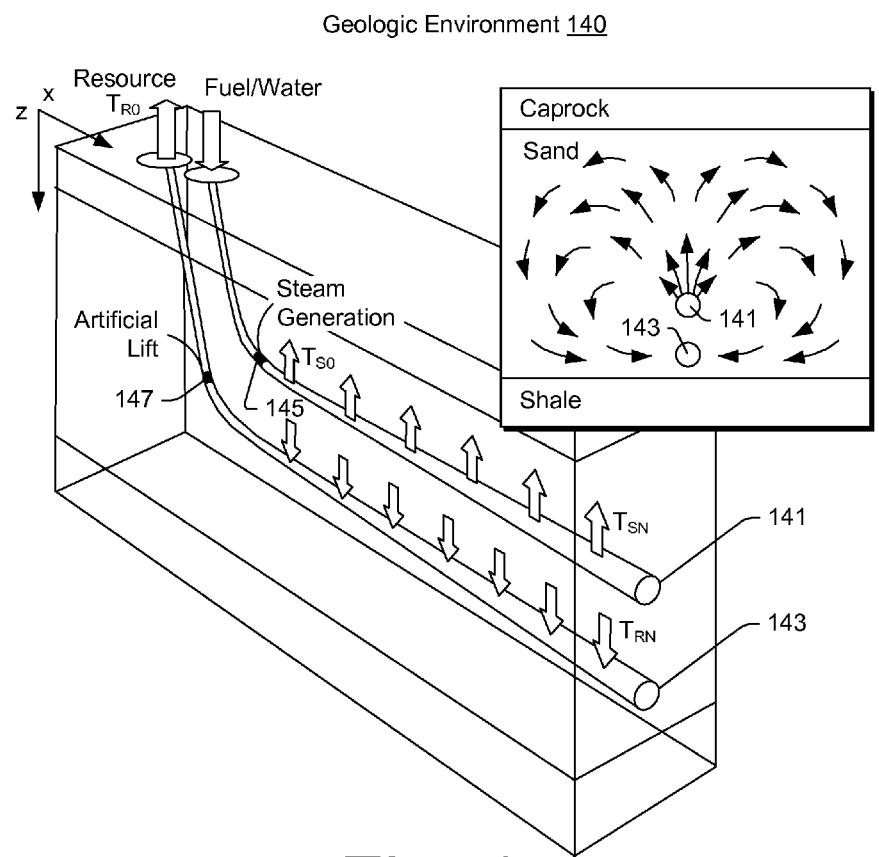

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

An electric submersible pump (ESP) or other downhole equipment may include one or more electric motors. A motor may be driven, for example, via a multiphase power supply and a power cable or cables that provide, for example, a 3-phase AC power signal. As an example, an ESP motor may be coupled to a 3-phase power signal via a balanced inductor network having a neutral, ungrounded node, which may be referred to as a "wye node" or "wye point" of the ESP motor. Voltage and current levels of the 3-phase AC power signal provided by a power supply to an ESP motor may be, for example, of the order of several kilovolts (e.g., or more) and tens of amperes and oscillate at a frequency of the order of about 60 Hz.

Adjustments may be made to an ESP, for example, where the ESP is outfitted with a variable-speed drive (VSD) unit. As an example, a VSD unit can include an ESP controller such as, for example, the UniConn™ controller marketed by Schlumberger Limited (Houston, Tex.). In combination, a VSD unit with an ESP controller allows for variations in motor speed, which may better manage power, heat, etc.

As an example, an ESP may include one or more sensors (e.g., gauges) that measure any of a variety of phenomena (e.g., temperature, pressure, vibration, etc.). A commercially available sensor is the Phoenix MultiSensor™ marketed by Schlumberger Limited (Houston, Tex.), which monitors intake and discharge pressures; intake, motor and discharge temperatures; and vibration and current-leakage. An ESP monitoring system may include a supervisory control and data acquisition system (SCADA). Commercially available surveillance systems include the espWatcher™ and the LiftWatcher™ surveillance systems marketed by Schlumberger Limited (Houston, Tex.), which provide for communication of data, for example, between a production team and well/field data equipment (e.g., with or without SCADA installations). Such a system may issue instructions to, for example, start, stop or control ESP speed via an ESP controller.

As to power to power a sensor (e.g., an active sensor), circuitry associated with a sensor (e.g., an active or a passive sensor), or a sensor and circuitry associated with a sensor, a DC power signal may be provided via an ESP cable and available at a wye point of an ESP motor, for example, powered by a 3-phase AC power signal. Where sufficient balance exists between the three phases of the AC power signal, the DC power signal may be sufficient for demands of one or more sensors, associated circuitry, etc. However, where unintended unbalance exceeds some reasonable level, the DC power signal may become "contaminated" (e.g., alternating at one or more frequencies) and may become unsuitable for powering one or more sensors, associated circuitry, etc. While a sensor, associated circuitry, etc., may include an integral voltage regulator for regulating a DC supply signal, where unintended unbalance exists, the nature of the signal reaching the integral voltage regulator may be insufficient to produce sustainable DC power.

Transmission of data, or communication of data, may be, at times, referred to as telemetry. Telemetry circuitry may be circuitry associated with one or more sensors, for example, to transmit data uphole, downhole or uphole and downhole (e.g., sensed data, data about sensor status, data based at least in part on sensed data, etc.). As an example, a telemetry process may include multiplexing a low power communication signal on high voltage, high current electrical circuitry that energizes a downhole motor. In such an example, DC power may be delivered to electrical circuitry or derived from the electrical circuitry to energize downhole equipment other than the downhole motor. For example, as mentioned, DC power may be delivered in a manner where downhole equipment can tap the DC power at a wye point of a downhole motor energized by three conductors of a power cable that carry 3-phase power. As another example, a secondary AC power signal may be delivered via a power cable in a manner such that the secondary AC power signal exists at the wye point. Such a secondary AC power signal may be smaller in terms of voltage and current (e.g., overall power) than a primary 3-phase AC power signal for powering a motor of an ESP. As yet another example, a choke electrically connected to a wye point may provide for a DC power signal based on a small fraction of "normal" unbalance in a 3-phase AC power signal (e.g., phase unbalance of a few percent). As an example, where a piece of downhole equipment is powered by a DC power signal, the secondary AC power signal may be converted to DC power signal.

As an example, a power cable may provide for delivery of power to an ESP, other downhole equipment or an ESP and other downhole equipment. Such a power cable may also provide for transmission of data to downhole equipment, from downhole equipment or to and from downhole equipment.

Where data is transmitted via a power cable from a "remote" location to a base or other "local" location, the data transmission process may be part of a remote monitoring process. For example, where a downhole electric motor is supplied with 3-phase power via a power cable, a downhole sensor may tap into a wye point of the electric motor to transmit data via the power cable. A remote monitoring process may, for example, monitor various parameters associated with downhole equipment operation, physical phenomena, etc. Such monitoring may facilitate operation of downhole equipment or other equipment (e.g., by an operator, a controller, etc.). For example, as to a downhole ESP, remote monitoring may provide for knowledge of actual values of well parameters related to surrounding reservoir or well bore fluids. A link to communicate monitored data from downhole to uphole may economically be implemented using the same power cable that delivers the electrical power to one or more motors of the ESP (e.g., noting that such a link may be used in a reverse manner to transmit data (e.g., control instructions, etc.) to downhole equipment (e.g., an ESP, a sensor, etc.)).

As mentioned, a power cable may be subject to a fault such as a ground fault. Depending on the nature of the fault, as an example, a fault may be classified as an uphole fault or a downhole fault. Further, a fault may stem from equipment and not a power cable itself. As to a "ground" fault, it is a type of fault that occurs when one or more conductors are inadvertently grounded (e.g., temporarily or permanently). For a power cable, erosion of insulation about a conductor may give rise to a ground fault. For equipment to which a power cable is electrically connected, mechanical damage to the equipment may cause a conductor or a conductive component to become inadvertently grounded (e.g., temporarily or permanently).

As to issues associated with ESP operations, a power supply may experience unbalanced phases, voltage spikes, presence of harmonics, lightning strikes, etc., which may, for example, increase temperature of an ESP motor, a power cable, etc.; a motor controller may experience issues when subjected to extreme conditions (e.g., high/low temperatures, high level of moisture, etc.); an ESP motor may experience a short circuit due to debris in its lubricating oil, water breakthrough to its lubricating oil, noise from a transformer which results in wear (e.g., insulation, etc.), which may lead to lubricating oil contamination; and a power cable may experience a issues (e.g. short circuit or other) due to electric discharge in insulation surrounding one or more conductors (e.g., more probable at higher voltages), poor manufacturing quality (e.g., of insulation, armor, etc.), water breakthrough, noise from a transformer, direct physical damage (e.g., crushing, cutting, etc.) during running or pulling operations), chemical damage (e.g., corrosion), deterioration due to high temperature, current above a design limit resulting in temperature increase, electrical stresses, etc.

As an example, where an ESP multiphase power cable develops a fault (e.g., temporarily or permanently) in the form of a current leakage path to ground on one of the power conductors, current carried by that conductor is conducted to ground through that path. In such a scenario, some current carried over the other conductors of the power cable may be conducted to ground via the current leakage path as well, for example, by flowing through the motor windings and into the conductor associated with the current leakage path.

However, as impedance of the motor windings is non-zero (e.g., of the order of hundreds of ohms or more), current that flows through the motor windings to the conductor associated with the current leakage path may be limited.

When a 3-phase power circuit for a motor experiences a ground or phase fault, as an example, a wye point may carry an AC voltage that may be a large fraction of the motor supply voltage. For example, assuming a 3% normal phase unbalance, a wye point of an ESP motor may be about 45 VAC for a 1.5 kV motor and 120 VAC for a 4 kV motor. At 70 Hz a nominal 500 H choke has about 250 kohms impedance rising to about 1 mohm at 30 Hz (e.g., a choke with high frequency bypass capacitors). Assuming a 250 ohm resistive or inductive connection to ground via a unit electrically connected to the wye point of the ESP motor, that unit may see a nominal voltage of about 100 VDC and almost no AC component (e.g., 0 VAC). The foregoing example demonstrates how the aforementioned choke may provide for a DC power signal via a tap to a wye point of an ESP motor where some "normal" phase unbalance exists. However, where a ground or phase fault condition exists, the wye point may rise to a large fraction (e.g., about 70%) of the phase voltage. For example, in a worst case scenario, the wye point may carry several kilovolts RMS (e.g., at about 30 Hz) for a 4 kV motor. In such an example, the unit electrically connected to the wye point of the ESP motor may see about 0 VDC, assuming the supply is effectively short circuited (e.g., and a couple of volts RMS after the choke). The actual level experienced by a unit electrically connected to a wye point of a motor may depend upon the nature of the condition or conditions. Accordingly, a ground fault (e.g., or phase fault or "phase-to-ground" fault) may impact the nature of a signal or signals carried at a wye point of a motor. Such a fault may be temporary or permanent. For example, depending on cause(s), a ground fault may dissipate and later reappear or exhibit other transient behavior. During periods where a ground fault does not exist, as an example, circuitry may respond automatically to "switch" from one operational mode to another with respect to powering one or more sensors, associated circuitry, etc. For example, a circuit may determine quality of a DC power signal supplied via uphole equipment via a downhole power cable (e.g., based on one or more characteristics of the DC power signal). Such a circuit may optionally be selected or programmable based on a sensor, telemetry circuitry, etc. For example, such a circuit may be triggered by a sensor entering an acquisition mode, a telemetry circuitry entering a communication mode, etc.

As an example, a circuit may be configured to determine that, even though a ground fault issue exists, some form of DC power signal remains and that equipment to be powered by DC power can use the remaining DC power, for example, with some amount of supplementation (e.g., via an AC to DC conversion). Where supplementation of a provided DC power signal occurs using an AC power signal (or signals), one ground fault state may be deemed a mixed DC/AC state (e.g., equipment powered via a mix of DC and DC derived from AC); whereas, for example, where the DC power signal is unsuitable, another ground fault state may be deemed an AC state (e.g., equipment powered via DC derived from AC). As an example, where a ground fault does not exist (e.g., unfaulted or non-ground fault state), a state may be deemed a DC state (e.g., equipment powered via DC supplied from an uphole power source via a power cable).

As an example, circuitry may be provided for use downhole that electrically connects to a wye point of an electric motor where the circuitry may derive power to power a unit (or units) via one or more AC power signals carried by the wye point even in the presence of a ground fault or faults. Such circuitry may also provide for telemetry (e.g., via a transformer, a capacitor, a transformer and a capacitor, etc.). Further, such circuitry may provide for reliable telemetry even where an environment is considered noisy.

As an example, a system may be configured for communication of information (e.g., data, instructions, data and instructions, etc.) via a cable or chained cables where the cable or cables are provided with multiphase electrical power for delivery to a multiphase electrical motor. In such an example, a sensor or sensors (e.g., a gauge or gauges) may be coupled to the cable or cables, optionally via the multiphase electrical motor. As an example, a sensor may output signals (e.g., high frequency data signals) via an interface. In such an example, the interface may be operatively coupled to a wye point of the multiphase electric motor, which may be, for example, a three-phase or higher phase connection point. Coupling of the interface to the wye point may be via equipment, for example, consider equipment such as a transformer, a capacitor, a transformer and a capacitor, etc. As mentioned, power may be provided via a wye point of a multiphase electric motor. For example, a sensor may be powered by a DC power supply and/or by an AC power supply where such power is transmitted via a cable and available at a wye point of a multiphase electric motor. As an example, a system may be configured to provide such power even where a phase-to-fault ground occurs. As an example, such a system may be configured for communication of information even where a fault has occurred.

As an example, a system may include circuitry for transmission of signals by changing magnitude of an unbalance voltage at wye point of a multiphase electric motor. As an example, such signals may be transmitted via one or more frequency modulation techniques (e.g., binary phase shift keying "BPSK", fixed or dynamic time period schemes, etc.). As an example, such signals may be transmitted that is associated with one or more threshold values. For example, an unbalance voltage at a wye point may be intentionally (e.g., deliberated) adjusted to cross a threshold voltage value to thereby transmit information. As an example, a signal may be preceded with predetermined preamble pattern (e.g., a header) for purposes of detection. As an example, a controller, a monitoring device, a gauge powered by a supplied voltage delivered via a wye point of an electric motor may continue to be powered in case of a phase-to-fault ground (e.g., as a type power cable fault). In such an example, communication may be maintained in the event of a ground fault on the power cable. As an example, a detector (e.g., as part of a sensor or a gauge) may be configured to measure unbalance voltages and detect a preamble signal, decode signals (e.g., as one or more commands, etc.). In such an example, equipment (e.g., a sensor, a gauge, a controller, etc.) may respond to signals (e.g., decoded signals). For example, equipment may be configured to execute a decoded command, to respond to a signal to control or operate a sensor, a transmitter, a valve, or other device.

To understand better how downhole equipment may fit into an overall operation, some examples of processes are described below as applied to basins and, for example, production from one or more reservoirs in a basin.

FIG. 1 shows examples of geologic environments 120 and 140. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with any of a variety of sensors, detectors, actuators, etc. For example, equipment 122 may include communication circuitry to receive and to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, etc.

As to the geologic environment 140, as shown in FIG. 1, it includes two wells 141 and 143 (e.g., bores), which may be, for example, disposed at least partially in a layer such as a sand layer disposed between caprock and shale. As an example, the geologic environment 140 may be outfitted with equipment 145, which may be, for example, steam assisted gravity drainage (SAGD) equipment for injecting steam for enhancing extraction of a resource from a reservoir. SAGD is a technique that involves subterranean delivery of steam to enhance flow of heavy oil, bitumen, etc. SAGD can be applied for Enhanced Oil Recovery (EOR), which is also known as tertiary recovery because it changes properties of oil in situ.

As an example, a SAGD operation in the geologic environment 140 may use the well 141 for steam-injection and the well 143 for resource production. In such an example, the equipment 145 may be a downhole steam generator and the equipment 147 may be an electric submersible pump (e.g., an ESP).

As illustrated in a cross-sectional view of FIG. 1, steam injected via the well 141 may rise in a subterranean portion of the geologic environment and transfer heat to a desirable resource such as heavy oil. In turn, as the resource is heated, its viscosity decreases, allowing it to flow more readily to the well 143 (e.g., a resource production well). In such an example, equipment 147 (e.g., an ESP) may then assist with lifting the resource in the well 143 to, for example, a surface facility (e.g., via a wellhead, etc.). As an example, where a production well includes artificial lift equipment such as an ESP, operation of such equipment may be impacted by the presence of condensed steam (e.g., water in addition to a desired resource). In such an example, an ESP may experience conditions that may depend in part on operation of other equipment (e.g., steam injection, operation of another ESP, etc.).

Conditions in a geologic environment may be transient and/or persistent. Where equipment is placed within a geologic environment, longevity of the equipment can depend on characteristics of the environment and, for example, duration of use of the equipment as well as function of the equipment. Where equipment is to endure in an environment over an extended period of time, uncertainty may arise in one or more factors that could impact integrity or expected lifetime of the equipment. As an example, where a period of time may be of the order of decades, equipment that is intended to last for such a period of time may be constructed to endure conditions imposed thereon, whether imposed by an environment or environments and/or one or more functions of the equipment itself.

Figure 2:
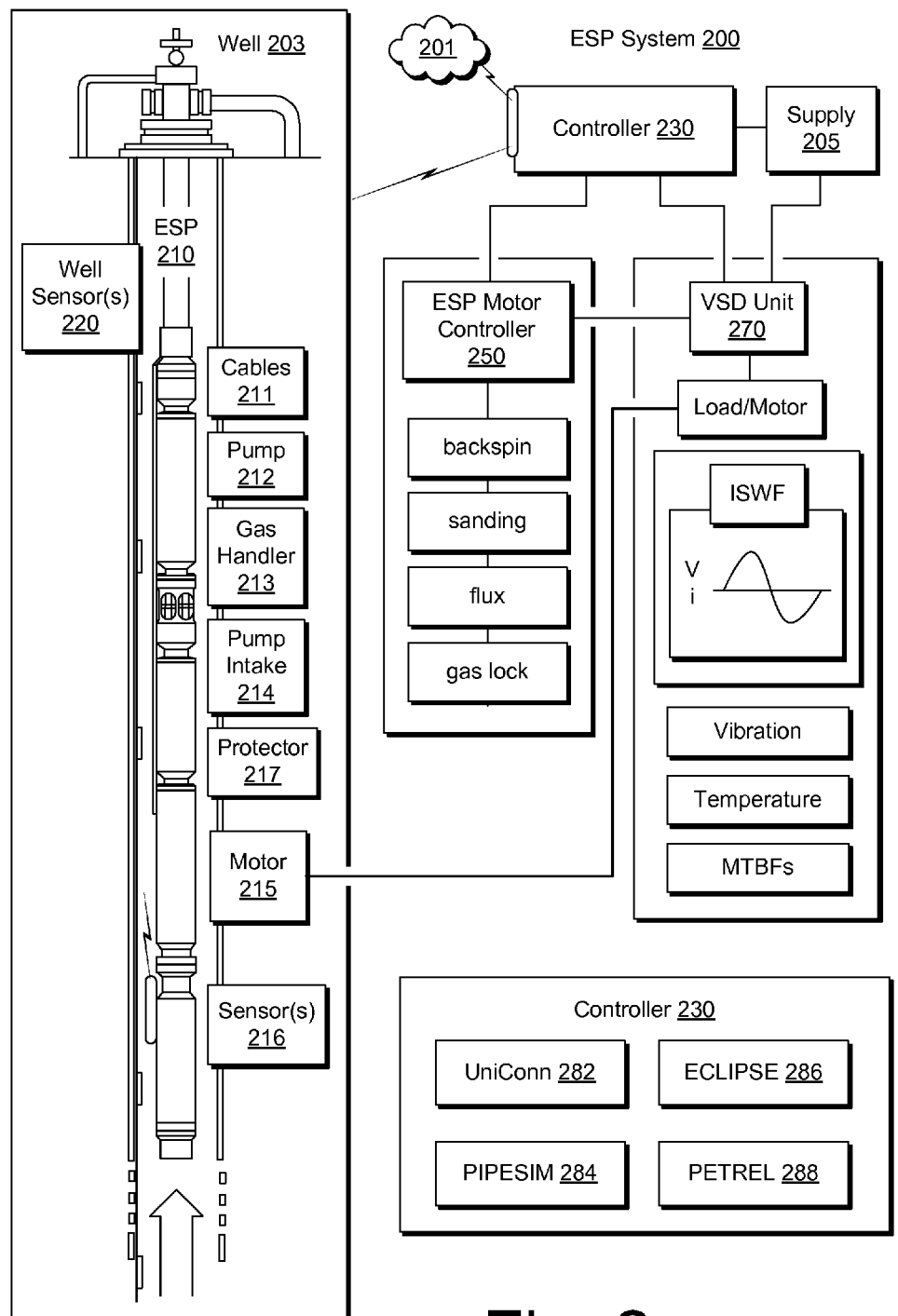
FIG. 2 illustrates an example of an electric submersible pump system.

FIG. 2 shows an example of an ESP system 200 that includes an ESP 210 as an example of equipment that may be placed in a geologic environment. As an example, an ESP may be expected to function in an environment over an extended period of time (e.g., optionally of the order of years). As an example, commercially available ESPs (such as the REDA™ ESPs marketed by Schlumberger Limited, Houston, Tex.) may find use in applications that call for, for example, pump rates in excess of about 4,000 barrels per day and lift of about 12,000 feet (e.g., about 3,660 m) or more.

In the example of FIG. 2, the ESP system 200 may be coupled to a network 201 and various components may be disposed in a well 203 in a geologic environment (e.g., with surface equipment, etc.). As shown, the ESP system can include a power supply 205, the ESP 210, a controller 230, a motor controller 250 and a VSD unit 270. The power supply 205 may receive power from a power grid, an onsite generator (e.g., natural gas driven turbine), or other source. The power supply 205 may supply a voltage, for example, of about 4.16 kV.

As shown, the well 203 includes a wellhead that can include a choke (e.g., a choke valve). For example, the well 203 can include a choke valve to control various operations such as to reduce pressure of a fluid from high pressure in a closed wellbore to atmospheric pressure. Adjustable choke valves can include valves constructed to resist wear due to high-velocity, solids-laden fluid flowing by restricting or sealing elements. A wellhead may include one or more sensors such as a temperature sensor, a pressure sensor, a solids sensor, etc.

As to the ESP 210, it is shown as including cables 211 (e.g., or a cable), a pump 212, gas handling features 213, a pump intake 214, a motor 215, one or more sensors 216 (e.g., temperature, pressure, strain, current leakage, vibration, etc.) and optionally a protector 217.

As an example, an ESP may include a REDA™ Hotline high-temperature ESP motor. Such a motor may be suitable for implementation in a thermal recovery heavy oil production system, such as, for example, SAGD system or other steam-flooding system.

As an example, an ESP motor can include a three-phase squirrel cage with two-pole induction. As an example, an ESP motor may include steel stator laminations that can help focus magnetic forces on rotors, for example, to help reduce energy loss. As an example, stator windings can include copper and insulation.

In the example of FIG. 2, the well 203 may include one or more well sensors 220, for example, such as the commercially available OpticLine™ sensors or WellWatcher BriteBlue™ sensors marketed by Schlumberger Limited (Houston, Tex.). Such sensors are fiber-optic based and can provide for real time sensing of temperature, for example, in SAGD or other operations. As shown in the example of FIG. 1, a well can include a relatively horizontal portion. Such a portion may collect heated heavy oil responsive to steam injection. Measurements of temperature along the length of the well can provide for feedback, for example, to understand conditions downhole of an ESP. Well sensors may extend thousands of feet into a well (e.g., 4,000 feet or 1,220 m or more) and beyond a position of an ESP.

In the example of FIG. 2, the controller 230 can include one or more interfaces, for example, for receipt, transmission or receipt and transmission of information with the motor controller 250, a VSD unit 270, the power supply 205 (e.g., a gas fueled turbine generator, a power company, etc.), the network 201, equipment in the well 203, equipment in another well, etc.

As shown in FIG. 2, the controller 230 may include or provide access to one or more modules or frameworks. Further, the controller 230 may include features of an ESP motor controller and optionally supplant the ESP motor controller 250. For example, the controller 230 may include the UniConn™ motor controller 282 marketed by Schlumberger Limited (Houston, Tex.). In the example of FIG. 2, the controller 230 may access one or more of the PIPESIM™ framework 284, the ECLIPSE™ framework 286 marketed by Schlumberger Limited (Houston, Tex.) and the PETREL™ framework 288 marketed by Schlumberger Limited (Houston, Tex.) (e.g., and optionally the OCEAN™ framework marketed by Schlumberger Limited (Houston, Tex.)).

As an example, the one or more sensors 216 of the ESP 210 may be part of a digital downhole monitoring system. For example, consider the commercially available Phoenix™ Multisensor xt150 system marketed by Schlumberger Limited (Houston, Tex.). A monitoring system may include a base unit that operatively couples to an ESP motor (see, e.g., the motor 215), for example, directly, via a motor-base crossover, etc. As an example, such a base unit (e.g., base gauge) may measure intake pressure, intake temperature, motor oil temperature, motor winding temperature, vibration, currently leakage, etc. As explained with respect to FIG. 4, a base unit may transmit information via a power cable that provides power to an ESP motor and may receive power via such a cable as well.

As an example, a remote unit may be provided that may be located at a pump discharge (e.g., located at an end opposite the pump intake 214). As an example, a base unit and a remote unit may, in combination, measure intake and discharge pressures across a pump (see, e.g., the pump 212), for example, for analysis of a pump curve. As an example, alarms may be set for one or more parameters (e.g., measurements, parameters based on measurements, etc.).

Where a system includes a base unit and a remote unit, such as those of the Phoenix™ Multisensor x150 system, the units may be linked via wires. Such an arrangement provide power from the base unit to the remote unit and allows for communication between the base unit and the remote unit (e.g., at least transmission of information from the remote unit to the base unit). As an example, a remote unit is powered via a wired interface to a base unit such that one or more sensors of the remote unit can sense physical phenomena. In such an example, the remote unit can then transmit sensed information to the base unit, which, in turn, may transmit such information to a surface unit via a power cable configured to provide power to an ESP motor.

In the example of FIG. 2, the motor controller 250 may be a commercially available motor controller such as the UniConn™ motor controller. The UniConn™ motor controller can connect to a SCADA system, the espWatcher™ surveillance system, etc. The UniConn™ motor controller can perform some control and data acquisition tasks for ESPs, surface pumps or other monitored wells. The UniConn™ motor controller can interface with the Phoenix™ monitoring system, for example, to access pressure, temperature and vibration data and various protection parameters as well as to provide direct current power to downhole sensors (e.g., the sensors 216). The UniConn™ motor controller can interface with fixed speed drive (FSD) controllers or a VSD unit, for example, such as the VSD unit 270.

For FSD controllers, the UniConn™ motor controller can monitor ESP system three-phase currents, three-phase surface voltage, supply voltage and frequency, ESP spinning frequency and leg ground, power factor and motor load.

For VSD units, the UniConn™ motor controller can monitor VSD output current, ESP running current, VSD output voltage, supply voltage, VSD input and VSD output power, VSD output frequency, drive loading, motor load, three-phase ESP running current, three-phase VSD input or output voltage, ESP spinning frequency, and leg-ground.

In the example of FIG. 2, the ESP motor controller 250 includes various modules to handle, for example, backspin of an ESP, sanding of an ESP, flux of an ESP and gas lock of an ESP. The motor controller 250 may include any of a variety of features, additionally, alternatively, etc.

In the example of FIG. 2, the VSD unit 270 may be a low voltage drive (VSD) unit, a medium voltage drive (MVD) unit or other type of unit (e.g., a high voltage drive, which may provide a voltage in excess of about 4.16 kV). As an example, the VSD unit 270 may receive power with a voltage of about 4.16 kV and control a motor as a load with a voltage from about 0 V to about 4.16 kV. The VSD unit 270 may include commercially available control circuitry such as the SpeedStar™ MVD control circuitry marketed by Schlumberger Limited (Houston, Tex.).

Figure 3:
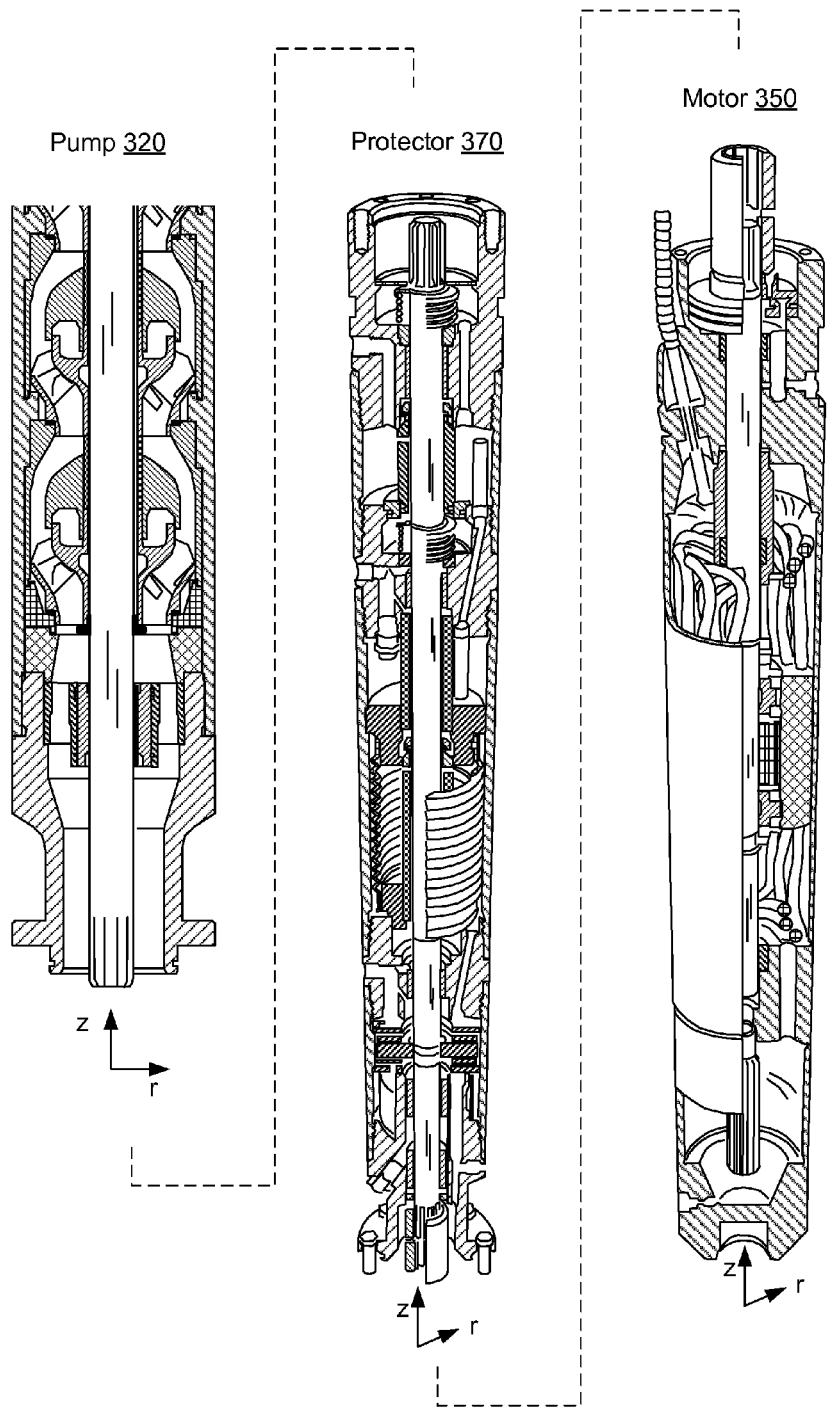
FIG. 3 illustrates examples of equipment.

FIG. 3 shows cut-away views of examples of equipment such as, for example, a portion of a pump 320, a protector 370 and a motor 350 of an ESP. The pump 320, the protector 370 and the motor 350 are shown with respect to cylindrical coordinate systems (e.g., r, z, Θ). Various features of equipment may be described, defined, etc. with respect to a cylindrical coordinate system. As an example, a lower end of the pump 320 may be coupled to an upper end of the protector 370 and a lower end of the protector 370 may be coupled to an upper end of the motor 350. As shown in FIG. 3, a shaft segment of the pump 320 may be coupled via a connector to a shaft segment of the protector 370 and the shaft segment of the protector 370 may be coupled via a connector to a shaft segment of the motor 350. As an example, an ESP may be oriented in a desired direction, which may be vertical, horizontal or other angle.

Figure 4:
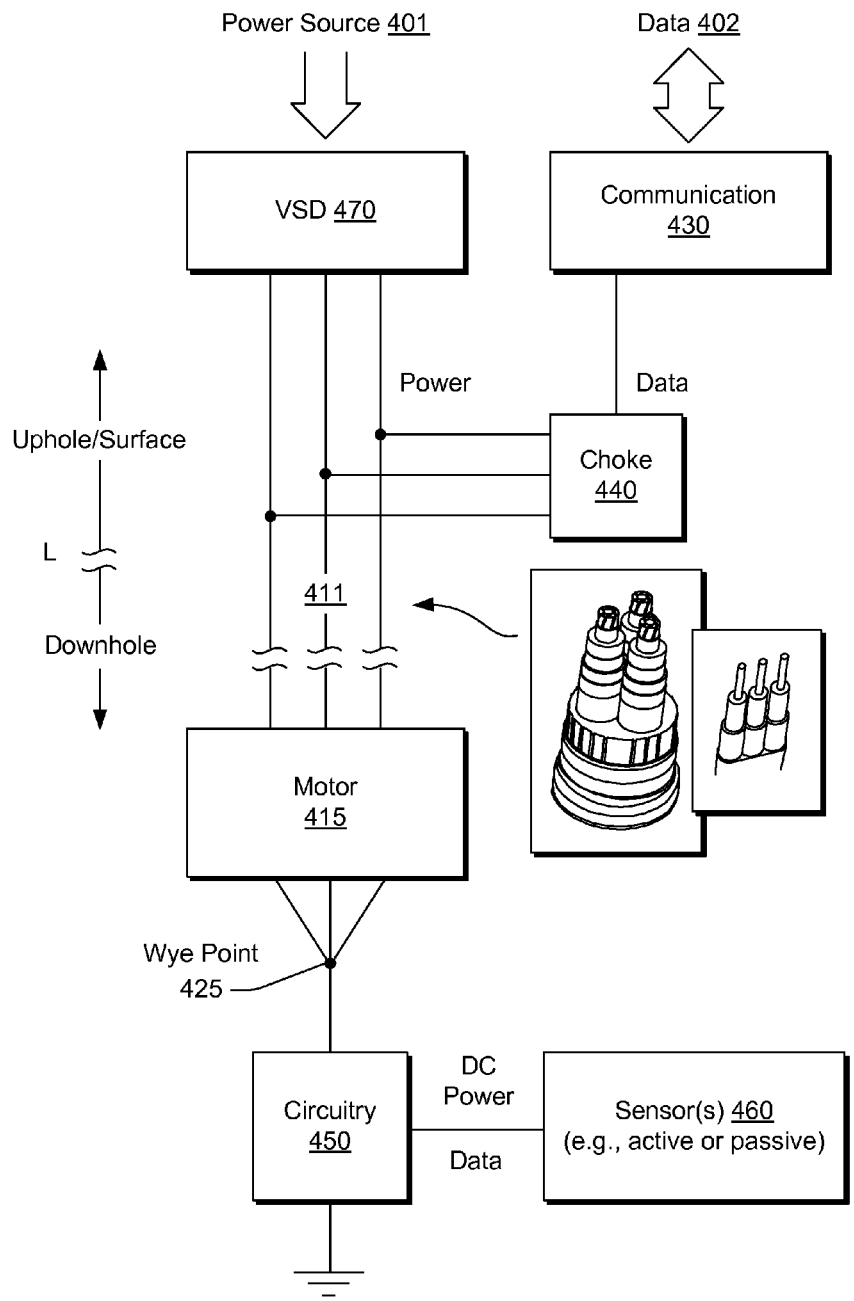
FIG. 4 illustrates examples of equipment.

FIG. 4 shows a block diagram of an example of a system 400 that includes a power source 401 as well as data 402. The power source 401 provides power to a VSD block 470 while the data 402 may be provided to a communication block 430. The data 402 may include instructions, for example, to instruct circuitry of the circuitry block 450, one or more sensors of the sensor block 460, etc. The data 402 may be or include data communicated, for example, from the circuitry block 450, the sensor block 460, etc. In the example of FIG. 4, a choke block 440 can provide for transmission of data signals via a power cable 411 (e.g., including motor lead extensions "MLEs"). A power cable may be provided in a format such as a round format or a flat format with multiple conductors. MLEs may be spliced onto a power cable to allow each of the conductors to physically connect to an appropriate corresponding connector of an electric motor.

As shown, the power cable 411 connects to a motor block 415, which may be a motor (or motors) of an ESP and be controllable via the VSD block 470. In the example of FIG. 4, the conductors of the power cable 411 electrically connect at a wye point 425. The circuitry block 450 may derive power via the wye point 425 and may optionally transmit, receive or transmit and receive data via the wye point 425. As shown, the circuitry block 450 may be grounded. While the wye point 425 is shown with three connections, which may correspond to three phases, a multiphase wye point may, as an example, include more than three phases.

As an example, power cables and MLEs that can resist damaging forces, whether mechanical, electrical or chemical, may help ensure proper operation of a motor, circuitry, sensors, etc.; noting that a faulty power cable (or MLE) can potentially damage a motor, circuitry, sensors, etc. Further, as mentioned, an ESP may be located several kilometers into a wellbore. Accordingly, time and cost to replace a faulty ESP, power cable, MLE, etc., can be substantial (e.g., time to withdraw, downtime for fluid pumping, time to insert, etc.).

Commercially available power cables include the REDAMAX™ Hotline™ ESP power cables (e.g., as well as motor lead extensions "MLEs"), which are marketed by Schlumberger Limited (Houston, Tex.). As an example, a REDAMAX™ Hotline™ ESP power cable can include combinations of polyimide tape, lead, EPDM, and PEEK to provide insulation and a jacket. Lead walls can provide for compatibility with high gas/oil ratio (GOR) and highly corrosive conditions. Armor can mechanically protect the cable and may be galvanized steel, heavy galvanized steel, stainless steel, or Monel® alloy. The pothead is an electrical connector between a cable and an ESP motor that may be constructed with metal-to-metal seals. A pothead can provide a mechanical barrier to fluid entry in high-temperature applications.

As an example of a REDAMAX™ Hotline™ ESP power cable, a 5 kV round ELBE G5R can include solid conductor sizes of 1 AWG/1, 2 AWG/1 and 4 AWG/1. As another example, a 5 kV flat EHLTB G5F can include a solid conductor size of 4 AWG/1. As to some examples, dimensions may be, for round configurations, about 1 inch to about 2 inches in diameter and, for flat configurations, about half an inch by about 1 inch to about 2 inches.

Figure 5:
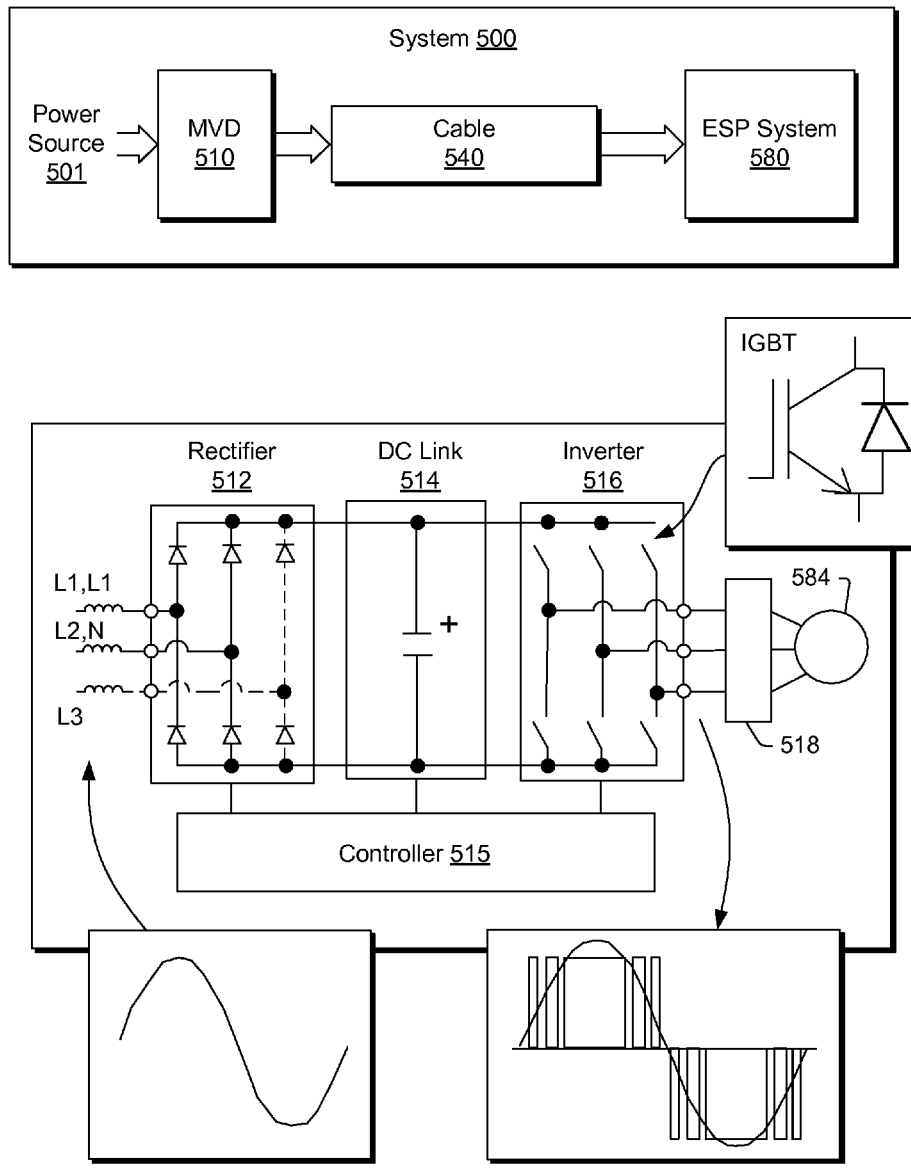
FIG. 5 illustrates an example of a system.

FIG. 5 shows an example of a system 500 that includes a MVD 510, an optional load filter 518, a cable 540 and an ESP system 580. As an example, the cable 540 may be a single cable or multiply strung cables. As an example, a cable or cables may have a length of the order of hundreds or thousands of meters. As to the MVD 510, it may be, for example, a MVD that includes five-level neutral-clamped PWM circuitry or it may be, for example, a MVD that includes cascade circuitry.

As an example, the MVD 510 may include a rectifier 512, a DC link 514, a controller 515 and an inverter 516, which may include insulated-gate bipolar transistors (IGBTs). As indicated in the example of FIG. 5, the optional load filter 518 may be operatively coupled to output from the inverter 516, for example, to help protect equipment such as a motor 584 of the ESP system 580. As shown in the example of FIG. 5, an MVD may include a front end diode rectifier (e.g., AC power source to DC) 512 and a back end PWM controlled IGBT inverter (e.g., DC to "AC") 516, where the load filter 518 connects to the output of the back end PWM controlled IGBT inverter 516 to damp harmonics that can result from switching of the IGBTs.

As an example, a load filter may receive input and filter that input to output a sinusoidal waveform. Without such a load filter (e.g., an unfiltered scenario), depending on various input characteristics, line characteristics, etc., harmonic resonance may occur in an ESP system and result in downhole equipment being exposed to large voltage spikes.

As power disturbances can affect run life of a system (e.g., mean time between failure "MTBF"), a load filter may be applied to provide a clean (e.g., "smooth") harmonics-mitigated sine wave that, in turn, can lessen system stress. Such a filter may, when applied to a drive and compared to an unfiltered drive, prolong run life of an ESP system.

As to harmonics, consider as an example, a waveform with a frequency of 60 Hz, which may be considered a fundamental frequency. Such a waveform may include a harmonic at 1850 Hz, which, in turn, can form a distorted waveform when combined with the fundamental frequency of 60 Hz. As an example, a load filter may filter input to avoid or dampen harmonics, which, in turn, provide a cleaner, less distorted waveform (e.g., a waveform resembling a pure fundamental frequency).

As an example, a system may include a line trap and a tune filter, which may allow for effective communication (e.g., telemetry) in a non-ground fault state and in a ground fault state (e.g., of a power cable of the system). As an example, a system may provide for effective communication (e.g., telemetry) in the presence of noise, for example, as generated by a pulse-width modulation type of variable speed drive (VSD). As an example, a system may provide for effective communication (e.g., telemetry) where the system includes a load filter or where the system does not include a load filter.

As an example, a line trap may be tuned to a single frequency or one or more frequencies or multiple frequency bands, for example, selected to carry communication signals at a particular frequency or frequencies (e.g., within one or more bands). As an example, a line trap may be tuned in such a way to block or attenuate noise, for example, in a particular frequency band, multiple frequency bands, etc. (e.g., as may be selected for communication of signals).

As an example, a system may include a tune filter, which may act to amplify input to the tune filter. For example, if noise is present in a signal at the input, the noise may be amplified as well as the signal. As an example, a system may include a line filter or a line trap, which may act to make the system more immune to noise.

Figure 6:
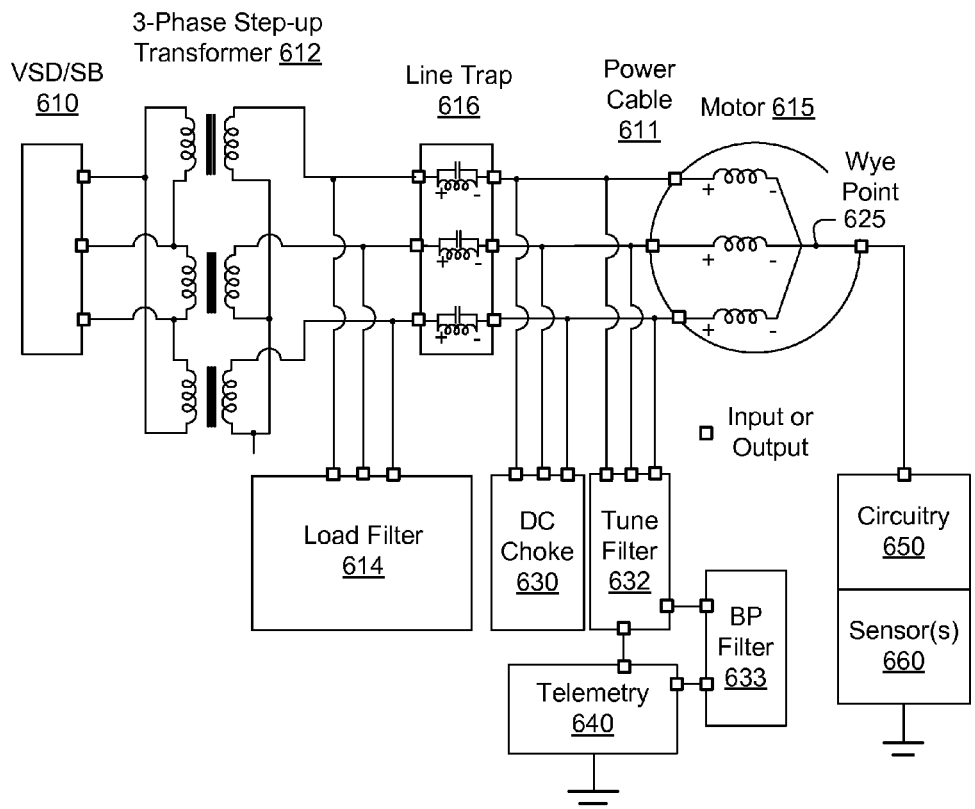
FIG. 6 illustrates an example of a system.
Figure 6:
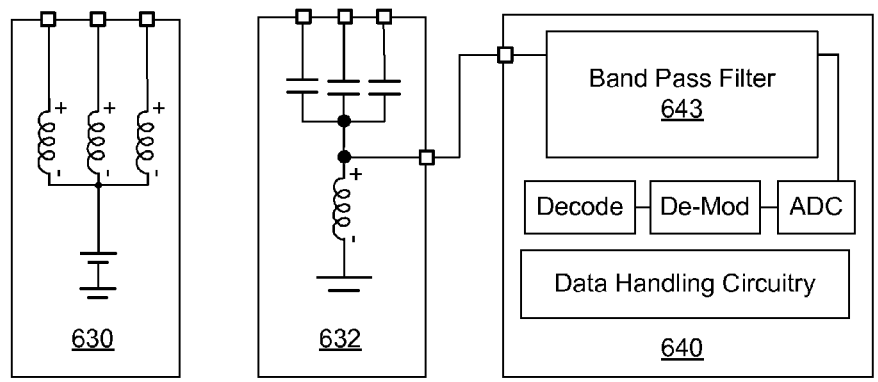

FIG. 6 shows an example of a system 600 that includes a line trap 616, a tune filter 632 and optionally a band pass filter 633. As shown in the example of FIG. 6, the system includes a variable speed drive or switch board (VSD/SB) 610, a power cable 611, a multiphase step-up transformer 612, a load filter 614, a multiphase electric motor 615 that includes a wye point 625 (e.g., a point where electrical connections exist from multiple phases), DC choke circuitry 630, telemetry circuitry 640, circuitry 650 operatively coupled to the wye point 625 and one or more sensors 660. FIG. 6 also shows some examples of circuitry components, for example, the DC choke 630 may include inductors, the tune filter 632 may include capacitors and at least one inductor and the telemetry circuitry 640 may include various circuits, modules, etc. for performing telemetry and telemetry related tasks. As an example, the telemetry circuitry 640 may include an analog-to-digital converter (ADC), a decoder, a demodulator and data handling circuitry, which may be optionally coupled to a controller or other equipment. As an example, the band pass filter 633 may include multiple stages, operational amplifiers, resistors, capacitors, diodes, etc. As shown in the example system 600 of FIG. 6, output from the tune filter 632 may be coupled to the band pass filter 633, which may be coupled to the telemetry circuitry 640. As an example, a band pass filter 643 may be included in the telemetry circuitry 640 (e.g., optionally operating as the band pass filter 633).

As an example, the load filter 614 may include a delta configuration, a star configuration or a combination delta/star configuration (e.g., to adjust capacitance, etc.). The load filter 614 may be tuned, for example, based at least in part on a possible leakage conductance of the three-phase transformer 612. As an example, the load filter 614 may be tuned to a particular target frequency. As an example, for a give leakage conductance in series with the load filter 614, a capacitance of the load filter 614 may for provide a desired cutoff frequency (e.g., LC circuit cutoff frequency). As an example, a cutoff frequency of the load filter 614 may be about 500 Hz (e.g., to remove a first modulation frequency, etc.). In the example of FIG. 6, the load filter 614 may be an ungrounded filter (e.g., to avoid connection to ground, which could interfere with signal conduction).

In the example of FIG. 6, information acquired via the one or more sensors 660 may be transmitted via the wye point 625, received via the tune filter 632 and provided to the telemetry circuitry 640, optionally via the band pass filter 633 (e.g., and/or the band pass filter 643). As an example, the system 600 may include circuitry that can issue one or more commands to the circuitry 650, for example, to instruct sensing by one or more of the sensors 660, to instruct data transmission via the circuitry 650, to instruct operation of equipment that may be operatively coupled to the circuitry 650, etc.

Figure 7:
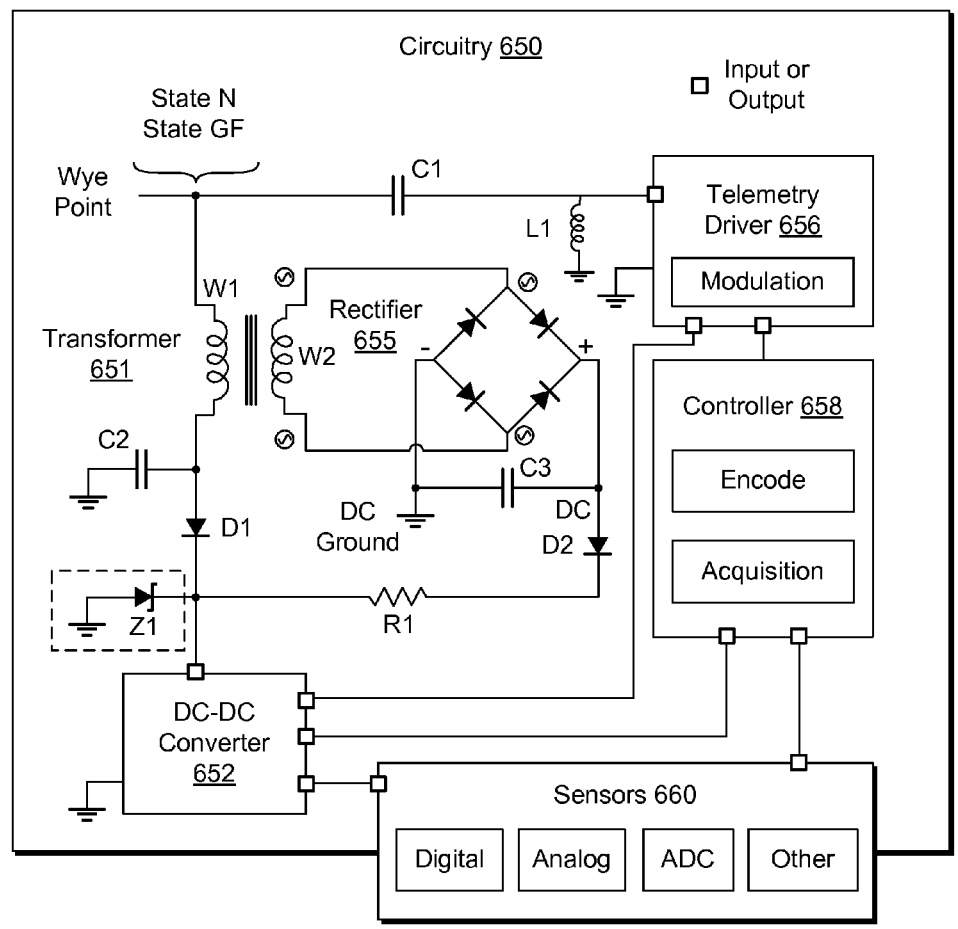
FIG. 7 illustrates an example of circuitry and sensors.

FIG. 7 shows an example of the circuitry 650 and examples of the one or more sensors 660, which may be suitable for use in the system 600 of FIG. 6. The circuitry 650 includes an electrical connection to a wye point of a motor, a transformer 651, a DC-DC converter 652, a rectifier 655, a telemetry driver 656 and a controller 658. In the example of FIG. 7, the circuitry 650 may include various components such as diodes (D), Zener diodes (Z), capacitors (C), inductors (L), windings (W), resistors (R), etc. As to the Zener diodes, as an example, the Zener diode Z1 may be optional.

As indicated, the circuitry 650 may operate in State N (normal) or a State GF (ground fault), for example, with respect to the wye point. In the example of FIG. 6, for State N, a primary winding (W1) of the transformer 651 acts to reduce detrimental impact of normal wye point unbalance and allows a DC power signal to proceed to the DC-DC converter 652. The DC-DC converter 652 can convert the DC power signal and provide one or more converted DC power signals to the telemetry driver 656, the controller 658 and the one or more sensors 660.

In the example of FIG. 6, for State GF, where abnormal, unintentional unbalance exists at the wye point (e.g., due to a ground fault), the primary winding (W1) of the transformer 651 acts to reduce detrimental impact of the abnormal wye point unbalance and further cooperates with the secondary winding (W2) to allow the rectifier 655 to derive a suitable DC power signal. As shown, a positive DC tap point of the rectifier 655 is electrically connected to the DC-DC converter 652. In such a manner, when a ground fault exists, unbalance voltage of alternating current at the wye point can be stepped down via the transformer 651 and then rectified via the rectifier 655 to supply a suitable DC power signal to the DC-DC converter 652, which may supply one or more DC power signals to the telemetry driver 656, the controller 658 and the one or more sensors 660. As an alternative, the rectifier 655 (e.g., optionally with associated circuitry) may provide a DC power signal or signals suitable for powering the telemetry driver 656, the controller 658 or the one or more sensors 660 (e.g., without reliance on the DC-DC converter 652).

As to telemetry, the telemetry driver 656 includes an electrical connection to the wye point. Sensed information (e.g., data) from the one or more sensors 660 may be acquired by the controller 658 and encoded using encoding circuitry. The encoded information may be provided to the telemetry driver 656 where modulation circuitry provides for signal modulation to carry the encoded information for transmission via the wye point of an electric motor. As an example, the telemetry driver 656 may alternatively or additionally receive information from the wye point. Where such information is modulated, encoded, or modulated and encoded, the circuitry 650 may provide for demodulation, decoding or demodulation and decoding.

As to the telemetry driver 656, as an example, it may transmit information to a wye point of an electric motor at one or more frequencies (e.g., approximately 10 kHz or more) higher than a power supply frequency of power supplied to drive the electric motor, which may be less than approximately 100 Hz and, for example, in a range of about 30 Hz to about 90 Hz. As an example, an electric motor may be supplied with power having a frequency of about 60 Hz. As an example, transmitted data signals may be modulated using multichannel frequency shift keying (FSK), orthogonal frequency division multiplexing (OFDM), or phase shift keying (PSK). As an example, telemetry may occur at one or more frequencies, which may include one or more frequencies greater than about 5 kHz, one or more frequencies greater than about 10 kHz, one or more frequencies greater than about 20 kHz, and/or one or more frequencies greater than about 30 kHz. As to some examples, telemetry may occur using two frequencies, three frequencies, four frequencies, five frequencies or more than five frequencies.

As an example, as shown in FIG. 7, an LC circuit may be formed by the capacitor C1 and the inductor L1, for example, as disposed between the wye point and the telemetry driver 656. Such an LC circuit may be tuned, for example, for downhole signal transmissions, uphole signal transmission, etc. As an example, one or more components in the circuitry 650 may act to divide voltage, for example, with respect to paths electrically coupled to the wye point. For example, in a ground fault scenario, a high voltage (e.g., elevated voltage) may exist at the wye point. As an example, an LC circuit may be part of a voltage divider to help ensure that a voltage does not exceed a voltage level that may risk damaging circuitry (e.g., the telemetry driver 656). As an example, the capacitor C1 may be tuned with respect to a voltage level as to dividing voltage at the wye point, for example, where the voltage at the wye point may become elevated due to a ground fault as to one or more of the phases of the multiphase power conduction system. As an example, circuitry may include voltage divider components that divide voltage with respect to a wye point where a telemetry driver is electrically coupled to the wye point along one branch and where circuitry such as a transformer, a DC-DC converter, etc. is electrically coupled to the wye point along another branch.

As an example, an electric submersible pump system can include a multiphase electric motor operatively coupled to a fluid pump where the multiphase motor includes a wye point; telemetry circuitry operatively coupled to the wye point where the telemetry circuitry generates AC telemetry signals; a multiphase power cable operatively coupled to the multiphase electric motor; and a tune filter operatively coupled to the multiphase power cable where the tune filter passes and amplifies AC telemetry signals generated by the telemetry circuitry, the AC telemetry signals being transmitted to the multiphase power cable via the wye point. In such an example, the tune filter can include a peak pass frequency, for example, where the peak pass frequency is associated with a telemetry frequency for the AC telemetry signals. As an example, a tune filter (e.g., one or more tune filters) may include multiple peak pass frequencies, for example, where each of the peak pass frequencies is associated with a respective telemetry frequency of multiple telemetry frequencies for the AC telemetry signals. As an example, where a system is configured for telemetry at one or more of multiple telemetry frequencies, telemetry may occur using one or more of the multiple telemetry frequencies, optionally, individually in time, simultaneously in time, etc. As an example, telemetry may occur at multiple telemetry frequencies, optionally in a non-redundant or a redundant manner (e.g., where information may differ or where information may be the same for purpose of quality and/or another purpose).

As an example, an electric submersible pump system can include a line trap operatively coupled to a multiphase power cable. In such an example, the line trap may include a valley trap frequency, for example, for attenuating noise generated by a power drive operatively coupled to the multiphase power cable. As an example, a valley trap frequency may be associated with a telemetry frequency for the AC telemetry signals. As an example, a line trap may include an impedance selected to exceed a ground impedance associated with a power drive in a ground fault state, for example, where the power drive is operatively coupled to the multiphase power cable.

As an example, a line trap may be a multi-function line trap. For example, a line trap may be configured to provide a trap function that attenuates noise associated with a power drive operatively coupled to a multiphase power cable and a high impedance function that exceeds a ground impedance of the power drive for a ground fault state of the multiphase power cable.

As an example, telemetry circuitry may be configured for generation of AC telemetry signals at a frequency where, for example, the frequency exceeds approximately 10 kHz. As an example, a telemetry frequency may be approximately 20 kHz or more. As an example, telemetry circuitry may generate telemetry signals over a band of frequencies, which may be characterized, for example, via an average frequency, a target frequency, etc.

As an example, an electric submersible pump system may include a band pass filter that includes a frequency pass band that includes a telemetry frequency for AC telemetry signals (e.g., generated by telemetry circuitry) carried by a multiphase power cable.

As an example, telemetry circuitry may include a tuned LC circuit electrically couplable to a wye point of an electric motor and, for example, to a telemetry driver of the telemetry circuitry. As an example, telemetry circuitry may include a voltage divider that includes a tuned LC circuit electrically couplable to a wye point of an electric motor and, for example, to a telemetry driver of the telemetry circuitry. In such an example, the tuned LC circuit may pass telemetry signals (e.g., AC signals) and act to limit voltage experienced by the telemetry driver in a ground fault state of the wye point (e.g., due to grounding of a phase of a multiphase power cable, grounding of a component in electrical contact with a phase of a multiphase power cable, etc.).

As an example, an electric submersible pump system can include a multiphase electric motor operatively coupled to a fluid pump where the multiphase motor includes a wye point; a multiphase power cable operatively coupled to the multiphase electric motor; a tune filter operatively coupled to the multiphase power cable where the tune filter passes and amplifies a frequency band of signals transmitted to the multiphase power cable via the wye point; and a line trap operatively coupled to the multiphase power cable where the line trap attenuates noise in the frequency band and where the line trap filter includes an impedance that mitigates loss of the frequency band of signals for a ground fault state of the system. As an example, such an electric submersible pump system may include telemetry circuitry operatively coupled to the wye point where the telemetry circuitry generates the frequency band of signals. As an example, such telemetry circuitry may derive power via the wye point.

As an example, an electric submersible pump system may include one or more pumps operatively coupled to a multiphase electric motor where the multiphase electric motor is powered via a multiphase power cable. Such a system may include a tune filter and a line trap, for example, to enhance operation of telemetry circuitry. In such an example, the tune filter may act to increase signal amplitude of telemetry signals and the line trap may act to attenuate noise, for example, generated by a power drive coupled to a multiphase power cable. In such an example, the line trap may also have an impedance sufficiently high to avoid loss of telemetry signals for a ground fault state.

Figure 8:
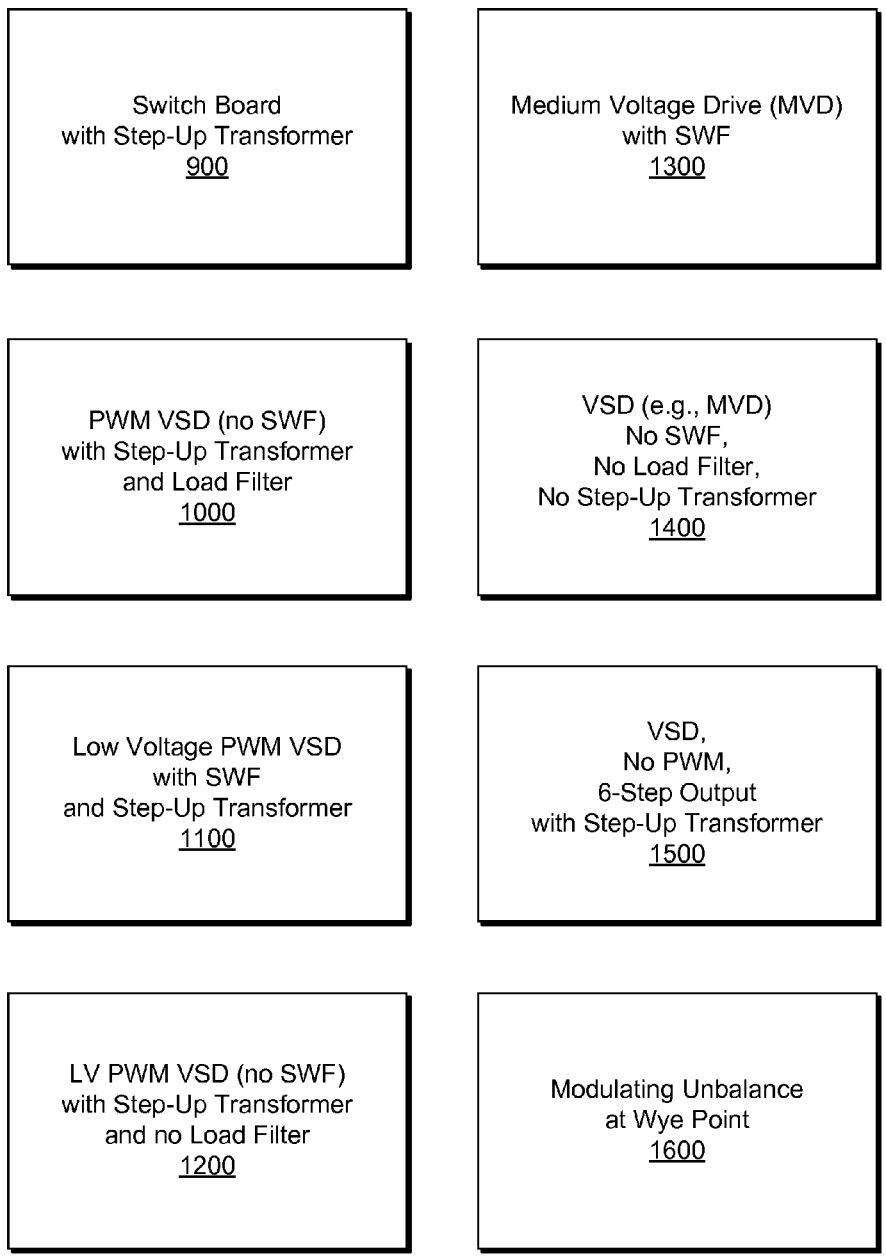
FIG. 8 illustrates examples of scenarios.

FIG. 8 shows some examples of scenarios 600, which may be understood, for example, with reference to systems 900, 1000, 1100, 1200, 1300, 1400, 1500 and 1600 of FIGS. 9, 10, 11, 12, 13, 14, 15 and 16, respectively.

As an example, the system 900 may include a tune filter 932 for purposes of telemetry, the system 1000 may include a line trap 1016 and a tune filter 1032 for purposes of telemetry, the system 1100 may include a tune filter 1132 for purposes of telemetry, the system 1200 may include a line trap 1216 and a tune filter 1232 for purposes of telemetry, the system 1300 may include a line trap 1316 and a tune filter 1332 for purposes of telemetry, the system 1400 may include a line trap 1416 and a tune filter 1432 for purposes of telemetry, and the system 1500 may include a line trap 1516 and a tune filter 1532 for purposes of telemetry. As an example, one or more of the systems 900, 1000, 1100, 1200, 1300, 1400 and 1500 may include a band pass filter (see, e.g., the filter 633 of FIG. 6).

As an example, a system can include a multiphase power cable, an multiphase electric motor operatively coupled to the multiphase power cable, a wye point, circuitry operatively coupled to the wye point, a tune filter operatively coupled to the multiphase power cable and telemetry circuitry operatively coupled to the tune filter and configured to receive information from the circuitry operatively coupled to the wye point. As an example, such a system may also include a line trap operatively coupled to the multiphase power cable. In such an example, with respect to the multiphase power cable, the tune filter may be operatively coupled to the power cable intermediate the line trap and the wye point.

As an example, a system may be an ESP system installed in an environment, for example, to pump fluid. For example, in FIG. 6, the system 600 may include a pump and other components that form an ESP, for example, where the electric motor 615 is an electric motor of an ESP. As to the systems 900, 1000, 1100, 1200, 1300, 1400, 1500 and 1600, these may be ESP systems.

As an example, a system may include a tune filter and optionally a line trap that can be configured to provide for effective communication of information (e.g., data, commands, etc.) to and/or from equipment operatively coupled to a wye point of an electric motor, which may be an electric motor of an ESP. Such a system may provide for effective communication even in the presence of a ground fault (e.g., full or partial), a noisy PWM type surface variable speed drive system, and/or a load filter.

As mentioned, a load filter may be installed in ESP system to filter out noise generated by an adjustable speed drive. For a multiphase system that includes three phases, a load filter may include, as an example, three large, high voltage capacitors connected in three-phase delta or Y configuration. Such a load filter may be configured to filter out AC signals above about 500 Hz.

As an example, during a ground fault condition, one or more phases operatively coupled to a load filter may become connected to ground (e.g., via a chassis, etc.). In such an example, the load filter may become a low impedance path (e.g., a short circuit) with respect to AC signals that may be present on a multiphase cable operatively coupled to the load filter. As a telemetry technique may include generation of AC signals and transmission of such AC signals via a multiphase power cable, where a load filter includes a low impedance path due to a ground fault, the AC signals may be lost, which, in turn, can render the telemetry technique inoperable (e.g., an AC uplink signal, data signals, etc., may be lost).

For various systems that include a line trap, the line trap can act to isolate the load filter from sinking AC signals (e.g., telemetry signals) to ground (e.g., via a chassis, etc.). For example, a line trap may be operatively coupled to a multiphase power cable intermediate a load filter and a wye point of an electric motor in a manner that acts to isolate the load filter in the presence of a ground fault. In such an example, by use of the line trap, AC signals may be tapped off of the multiphase power cable, for example, using a tune filter that may then provide the processed AC signals to telemetry circuitry. Accordingly, even where a load filter is present in a system that has experienced a ground fault, through use of a line trap, AC signal-based telemetry may still be used.

As an example, a system may include a large amount of PWM noise, for example, as produced by a variable speed drive. As an example, a system may include a line trap that is tuned to a single frequency or multiple frequency bands that may be selected to carry AC communication signals at frequencies within those bands. In such an example, the line trap may be tuned in such a way to effectively block or attenuate noises in a specific band of frequencies or multiple bands of frequencies that may have been selected for one or more communication channels.

As an example, a system may include a tune filter. As indicated in the example of FIG. 6 (see, e.g., the tune filter 632 and components thereof), a tune filter may be or include a band pass filter, for example, that acts to pass and amplify AC signals within a selected band or bands of frequencies while effectively blocking or attenuating other signals outside the selected band or bands.

As an example, a system may include a line trap and a tune filter. Such a system may provide for efficient and cost effective telemetry, for example, with respect to downhole equipment even in the presence of ground fault, strong noise generated by an adjustable speed drive, and a load filter.

Figure 9:
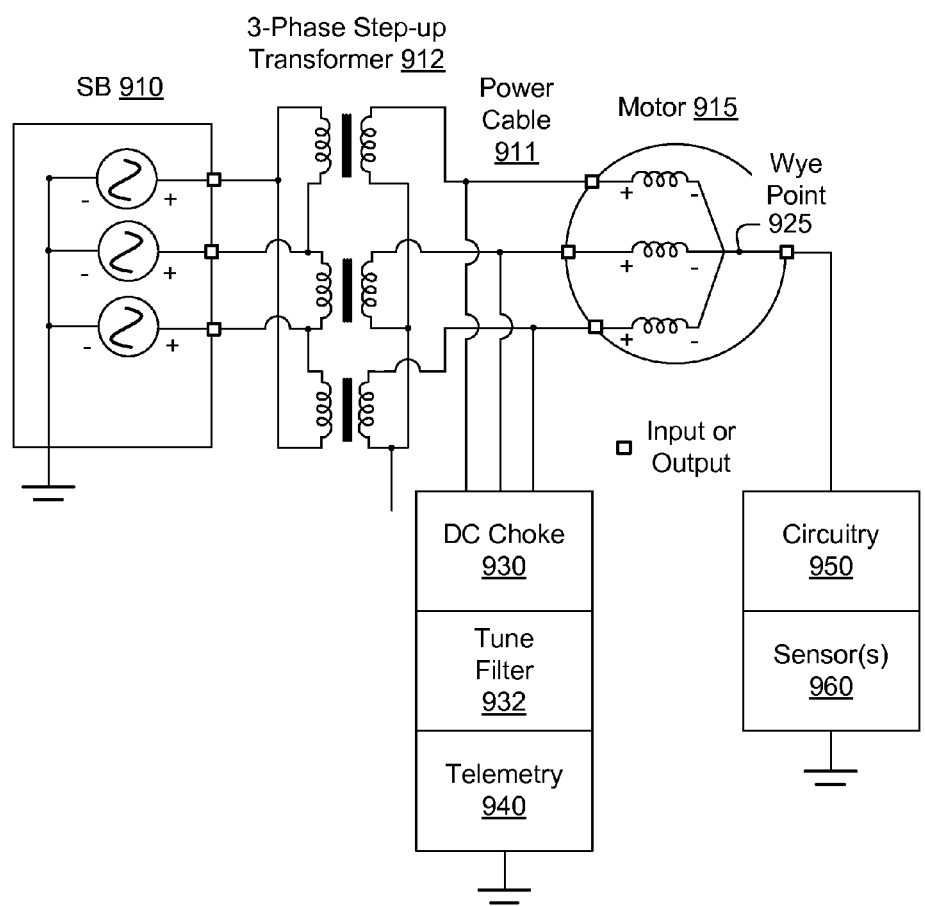
FIG. 9 illustrates an example of a system.

As to the example system 900 of FIG. 9, it includes a switch board 910, a power cable 911, a step-up transformer 912, an electric motor 915, a wye point 925, a DC choke 930, the tune filter 932, telemetry circuitry 940, circuitry 950 and one or more sensors 960. Various aspects of the system 900 may be understood, for example, with reference to the system 600 of FIGS. 6 and 7. In the system 900, as a relatively pure sine wave is provided by the switch board 910 (e.g., 480 V three phase), noise may be minimal and therefore telemetry may be used without implementing a line trap such as the line trap 616 of FIG. 6. In the example of FIG. 9, the tune filter 932 may enhance telemetry, for example, where it is tuned to one or more frequencies (e.g., discrete or bands of frequencies) for purposes of AC signal-based telemetry. As a load filter is not present in the system 900, where a ground fault occurs, the system 900 may be operable with AC signal-based telemetry.

Figure 10:
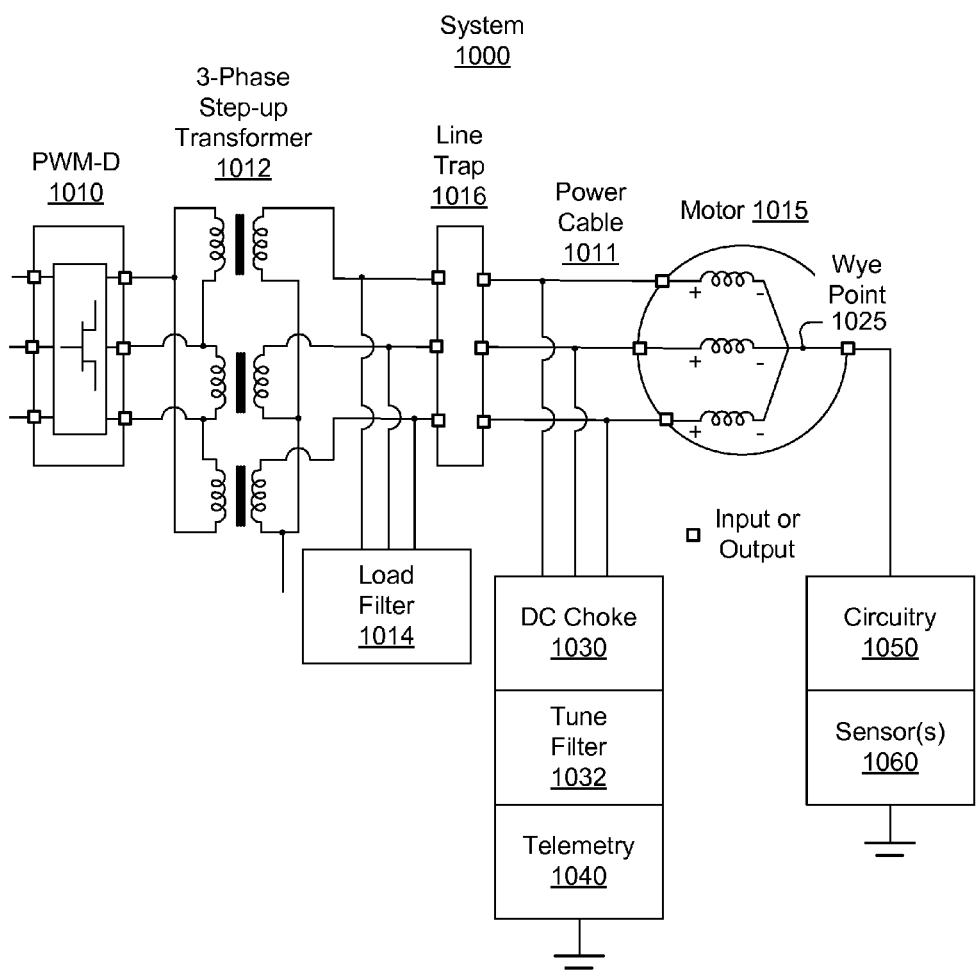
FIG. 10 illustrates an example of a system.

As to the example system 1000 of FIG. 10, it includes a PWM VSD 1010 without a sine wave filter (SWF), a power cable 1011, a step-up transformer 1012, a load filter 1014 (see, e.g., the load filter 614 of FIG. 6), an electric motor 1015, the line trap 1016, a wye point 1025, a DC choke 1030, the tune filter 1032, telemetry circuitry 1040, circuitry 1050 and one or more sensors 1060. Various aspects of the system 1000 may be understood, for example, with reference to the system 600 of FIGS. 6 and 7. In the system 1000, the load filter 1040 may act to filter noise that may be generated by the PWM VSD 1010 and it may act to shift resonance of the power delivery components, for example, to shift a natural resonant frequency downward and away from frequencies that may be desirably implemented in AC signal-based telemetry. As the load filter 1014 is present, which may risk sucking out AC signals via a low impedance path if a ground fault occurs, the line trap 1016 is provided, which may enable AC signal-based telemetry in the presence of a ground fault. In the example of FIG. 10, the tune filter 1032 may enhance telemetry, for example, where it is tuned to one or more frequencies (e.g., discrete or bands of frequencies) for purposes of AC signal-based telemetry.

Figure 11:
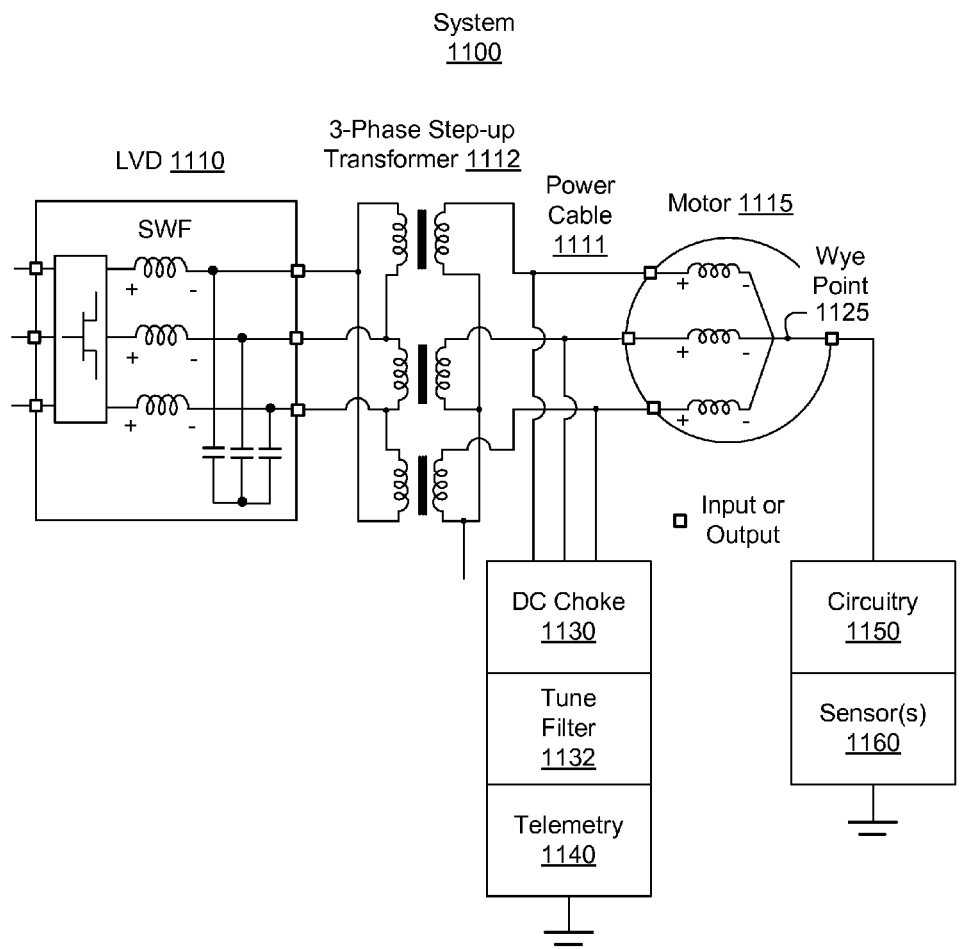
FIG. 11 illustrates an example of a system.

As to the example system 1100 of FIG. 11, it includes a low voltage drive (LVD) 1110 with a sine wave filter (SWF), a power cable 1111, a step-up transformer 1112, an electric motor 1115, a wye point 1125, a DC choke 1130, the tune filter 1132, telemetry circuitry 1140, circuitry 1150 and one or more sensors 1160. Various aspects of the system 1100 may be understood, for example, with reference to the system 600 of FIGS. 6 and 7. In the system 1100, as an acceptable sine wave may be provided via the SWF of the LVD 1110 and as the step-up transformer 1112 may act to isolate noise as well as ground fault issues, noise may be minimal and therefore telemetry may be used without implementing a line trap such as the line trap 616 of FIG. 6. As an example, the system 1100 of FIG. 11 may have a natural resonant frequency of about 2.2 kHz where a capacitor load bank of the LVD 1110 acts to shift the resonant frequency down to about 500 Hz (e.g., at secondary side, of LC filter forming the SWF). In the example system 1100, as such a capacitor load bank is isolated from the power cable 1111 and various other components by the step-up transformer 1112, where a ground fault may occur, the circuitry of the LVD 1110 may not impact AC signals that may be used for telemetry.

In the example of FIG. 11, the tune filter 1132 may enhance telemetry, for example, where it is tuned to one or more frequencies (e.g., discrete or bands of frequencies) for purposes of AC signal-based telemetry. As a load filter is not present in the system 1100 or as various circuits of the LVD 1110 are isolated by location of the step-up transformer 1112, where a ground fault occurs, the system 1100 may be operable with AC signal-based telemetry.

Figure 12:
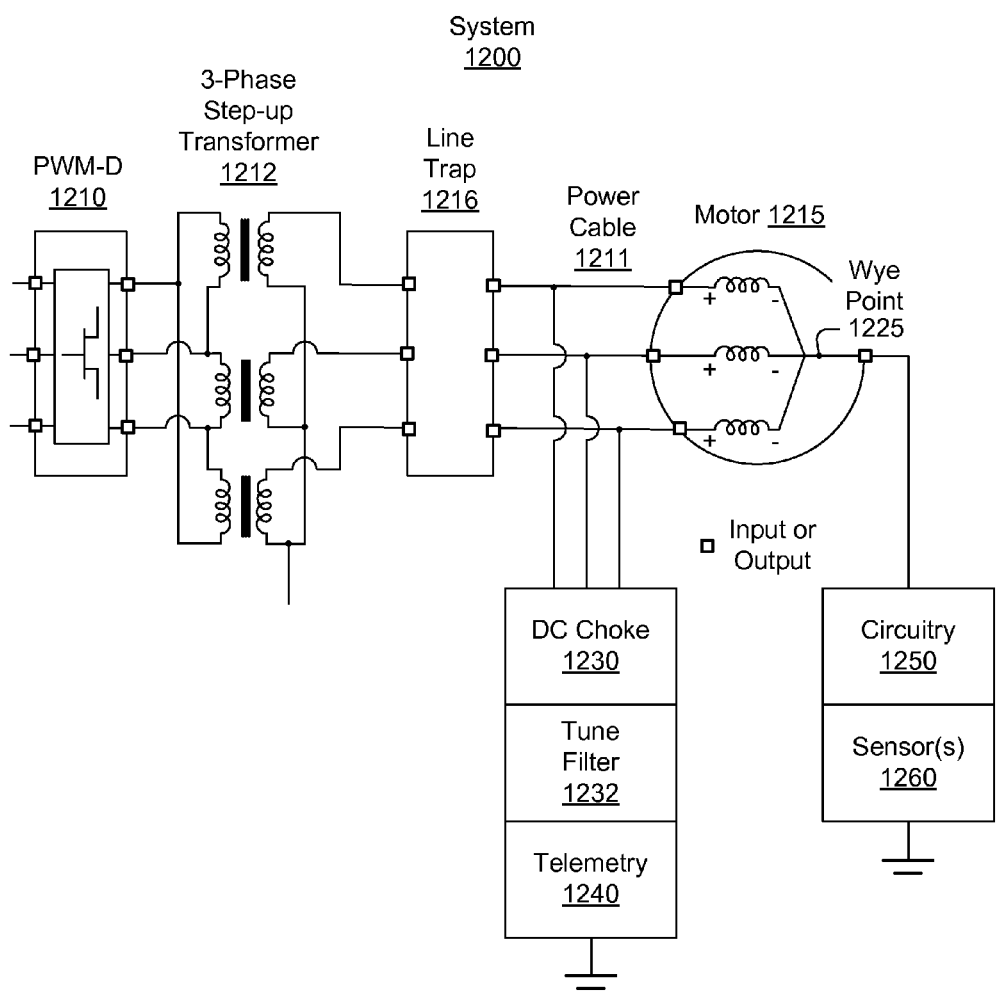
FIG. 12 illustrates an example of a system.

As to the example system 1200 of FIG. 12, it includes a low voltage PWM VSD 1210 without a sine wave filter (SWF), a power cable 1211, a step-up transformer 1212, an electric motor 1215, the line trap 1216, a wye point 1025, a DC choke 1230, the tune filter 1232, telemetry circuitry 1240, circuitry 1250 and one or more sensors 1260. Various aspects of the system 1200 may be understood, for example, with reference to the system 600 of FIGS. 6 and 7. As shown, the system 1200 does not include a load filter such as the load filter 614 of FIG. 6.

For the system 1200, the line trap 1216 may be configured with a footprint that includes dimensions of the order of about one meter by one meter or less. As an example, the line trap 1216 may attenuate noise from a primary side, for example, to avoid interference by the noise with respect to telemetry signals.

Figure 13:
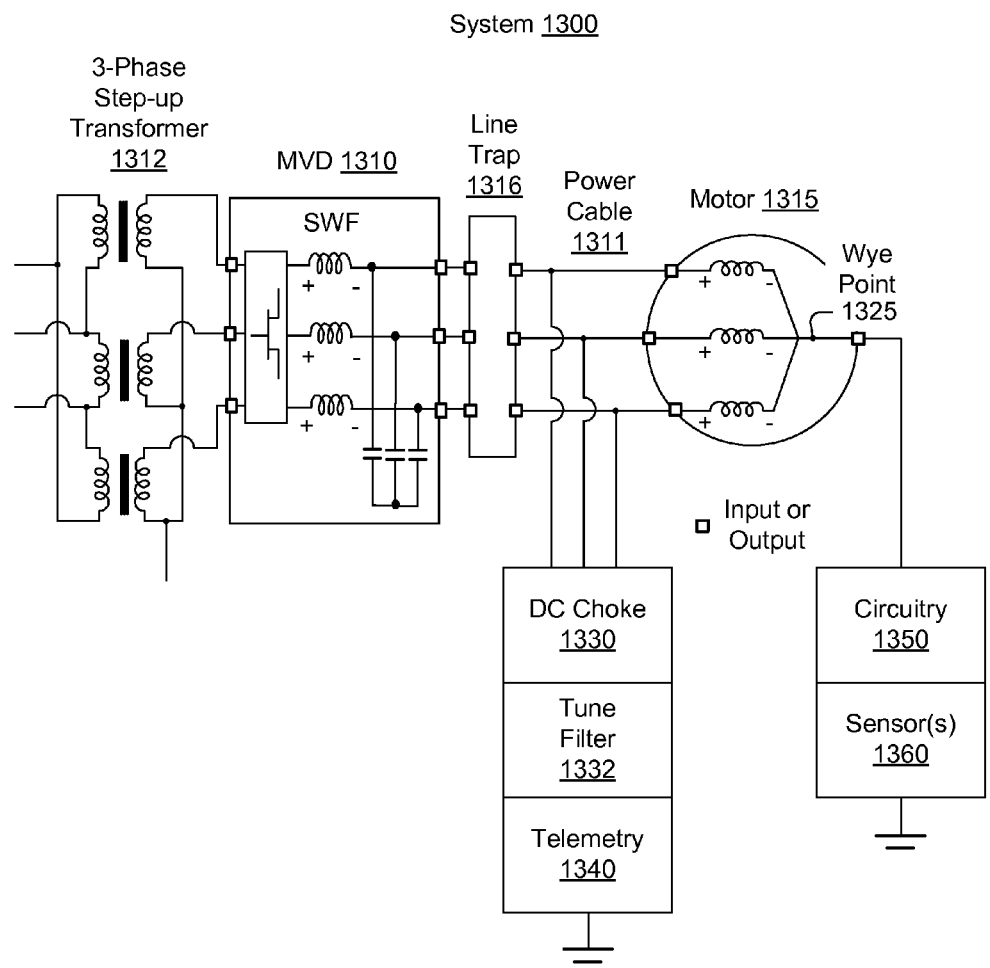
FIG. 13 illustrates an example of a system.

As to the example system 1300 of FIG. 13, it includes a medium voltage drive (MVD) 1310 with a sine wave filter (SWF), a power cable 1311, a step-up transformer 1312 (upstream from the MVD 1310), an electric motor 1315, the line trap 1316, a wye point 1325, a DC choke 1330, the tune filter 1332, telemetry circuitry 1340, circuitry 1350 and one or more sensors 1360. Various aspects of the system 1300 may be understood, for example, with reference to the system 600 of FIGS. 6 and 7. In the system 1300, the step-up transformer 1312 may act to isolate at least some line noise before input to the MVD 1310, which may be a 4.16 kV three phase sine wave drive. Where noise is at an acceptable level (e.g., at about 21 kHz or other high frequency or frequencies that may be implemented for AC signal-based telemetry), the system 1300 may implement telemetry optionally without a line trap such as the line trap 616 of FIG. 6. However, where a ground fault occurs, components of the MVD 1312 may provide a low impedance path or paths that may suck out AC signals at a telemetry frequency or frequencies. Accordingly, the system 1300 includes the line trap 1316, which may enable AC signal-based telemetry in the presence of a ground fault. In the example of FIG. 13, the tune filter 1332 may enhance telemetry, for example, where it is tuned to one or more frequencies (e.g., discrete or bands of frequencies) for purposes of AC signal-based telemetry.

Figure 14:
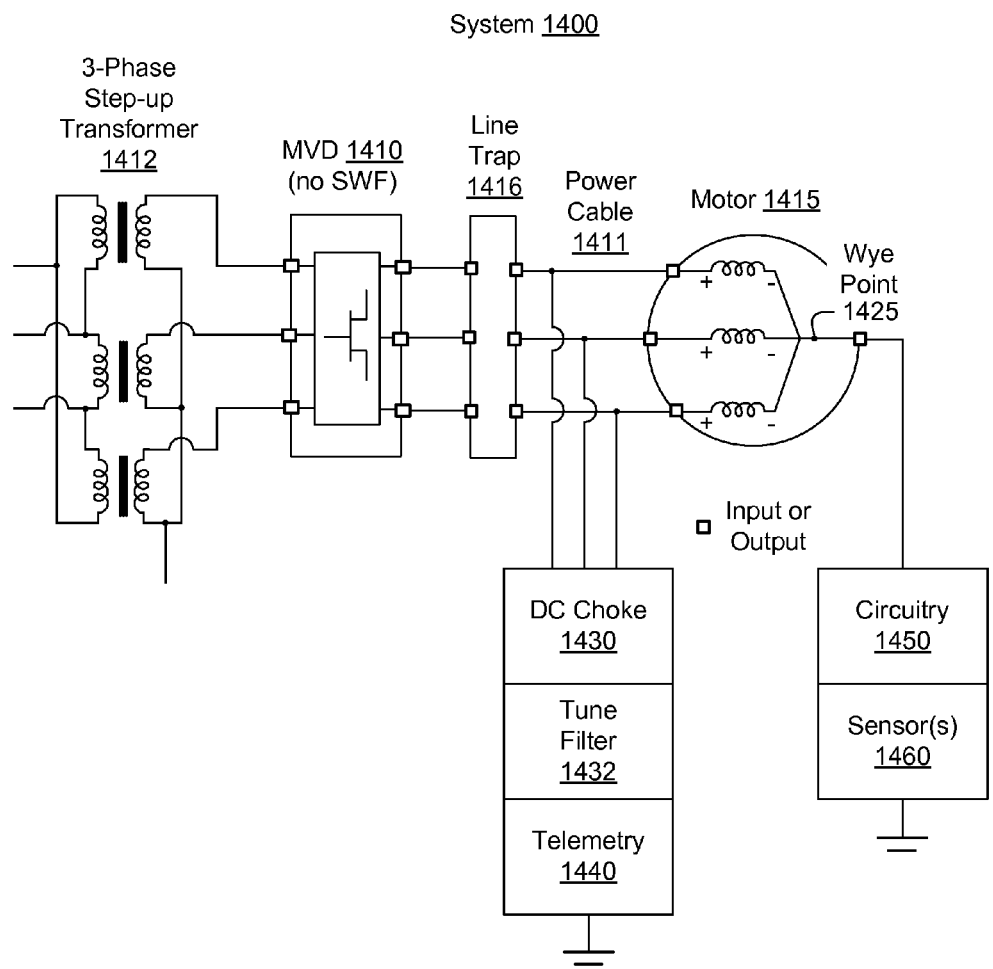
FIG. 14 illustrates an example of a system.

As to the example system 1400 of FIG. 14, it includes a medium voltage drive (MVD) 1410 without a sine wave filter (SWF), a power cable 1411, a step-up transformer 1412 (upstream from the MVD 1410), an electric motor 1415, the line trap 1416, a wye point 1425, a DC choke 1430, the tune filter 1432, telemetry circuitry 1440, circuitry 1450 and one or more sensors 1460. Various aspects of the system 1400 may be understood, for example, with reference to the system 600 of FIGS. 6 and 7. In the system 1400, the step-up transformer 1412 may act to isolate at least some line noise before input to the MVD 1410, which may be a 4.16 kV three phase sine wave drive. Where noise is at an acceptable level (e.g., at about 21 kHz or other high frequency or frequencies that may be implemented for AC signal-based telemetry), the system 1400 may implement telemetry optionally without a line trap such as the line trap 616 of FIG. 6. However, where a ground fault occurs, components of the MVD 1412 may provide a low impedance path or paths that may suck out AC signals at a telemetry frequency or frequencies. Accordingly, the system 1400 includes the line trap 1416, which may enable AC signal-based telemetry in the presence of a ground fault. In the example of FIG. 14, the tune filter 1432 may enhance telemetry, for example, where it is tuned to one or more frequencies (e.g., discrete or bands of frequencies) for purposes of AC signal-based telemetry.

Figure 15:
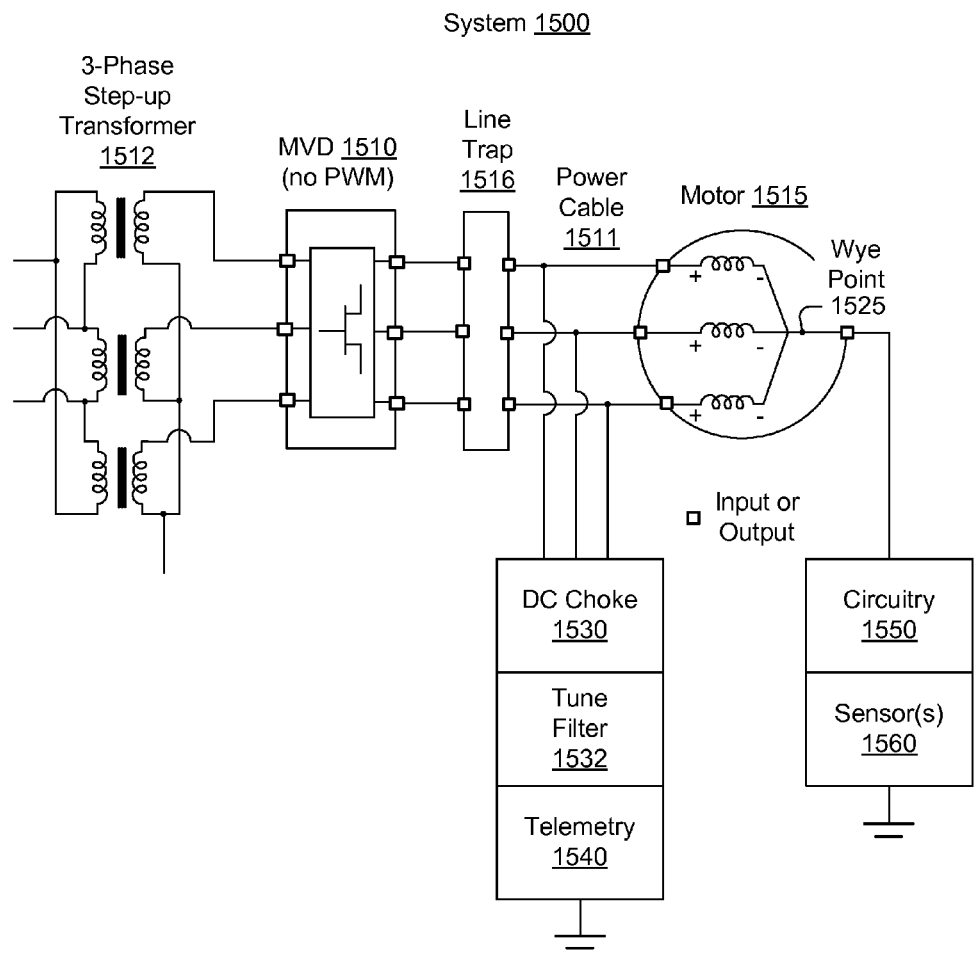
FIG. 15 illustrates an example of a system.

As to the example system 1500 of FIG. 15, it includes a medium voltage drive (MVD) 1510 without PWM, a power cable 1511, a step-up transformer 1512 (e.g., upstream from the MVD 1510), an electric motor 1515, the line trap 1516, a wye point 1525, a DC choke 1530, the tune filter 1532, telemetry circuitry 1540, circuitry 1550 and one or more sensors 1560. Various aspects of the system 1500 may be understood, for example, with reference to the system 600 of FIGS. 6 and 7. In the system 1500, the step-up transformer 1512 may act to isolate at least some line noise before input to the MVD 1510, which may be a 4.16 kV three phase sine wave drive. Where noise is at an acceptable level (e.g., at about 21 kHz or other high frequency or frequencies that may be implemented for AC signal-based telemetry), the system 1500 may implement telemetry optionally without a line trap such as the line trap 616 of FIG. 6. However, where a ground fault occurs, components of the MVD 1512 may provide a low impedance path or paths that may suck out AC signals at a telemetry frequency or frequencies. Accordingly, the system 1500 includes the line trap 1516, which may enable AC signal-based telemetry in the presence of a ground fault (e.g., to mitigate consequences of a ground fault). In the example of FIG. 15, the tune filter 1532 may enhance telemetry, for example, where it is tuned to one or more frequencies (e.g., discrete or bands of frequencies) for purposes of AC signal-based telemetry.

As an example, in comparing a MVD and a LVD, an output side of an MVD may include sine wave drive circuitry and an input side may include an isolation transformer (on primary side); whereas, an output side of an LVD may include an isolation transformer (see, e.g., the LVD system 1100 of FIG. 11 and the MVD system 1300 of FIG. 13). As an example, where a MVD includes sine wave drive circuitry on an output side without an isolation transformer on the output side (e.g., secondary side), a telemetry signal may be exposed to the sine wave circuitry and be "sucked out" where a ground fault exists.

As an example, numerical simulations of a system demonstrated a line trap could reduce noise at about 20 kHz (e.g., by about −20 dB) and that a tune filter could enhance signal at about 20 kHz (e.g., by about +30 dB). In such an example, the system included a band pass filter with a center frequency of about 20 kHz and a bandwidth of about 4 kHz. As an example, telemetry may occur using more than one frequency (e.g., consider two or more frequencies) and telemetry may be maintained (e.g., for one or more frequencies) in the presence of a ground fault (e.g., to provide a signal approximately equal to signal without a ground fault). For a built system with a load filter, a line trap and a tune filter, trials demonstrated that telemetry at about 20 kHz with signals of about 10 V peak-to-peak could be maintained in the presence of a ground fault. In the built system, circuitry (e.g., a gauge) received DC power in the presence of the ground fault.

As an example, various circuits may be provided as an equipment component or equipment components. For example, a line trap may be provided in a utility box that may have a footprint of about a meter by a meter. As an example, various circuits may be included in a drive. For example, the line trap 1316 of the system 1300 of FIG. 13 may be included in a utility box for the MVD 1310 (e.g., a drive with an integrated line trap).

Figure 16:
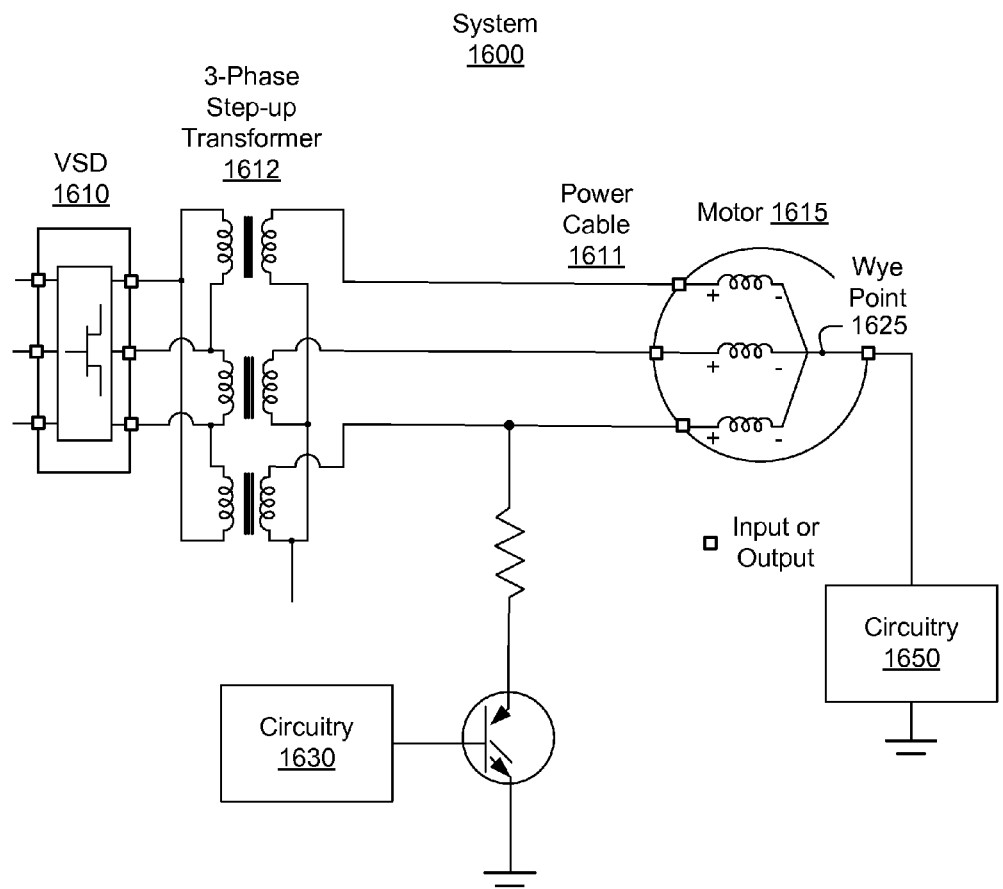
FIG. 16 illustrates an example of a system.

FIG. 16 shows an example of a system 1600 that includes a VSD 1610, a power cable 1611, a step-up transformer 1612, an electric motor 1615, a wye point 1625, circuitry 1630 and circuitry 1650 operatively coupled to the wye point 1625.

As an example, the system 1600 may be configured such that unbalance voltage at the wye point 1625 may be controlled, for example, via the circuitry 1630, which is operatively coupled to at least one of the phases of the multiphase cable 1611. As indicated, the circuitry 1630 may be configured to couple a line to ground, for example, which may, in turn, cause unbalance at the wye point 1625. In such an example, the unbalance may be deemed intentional and may cause a voltage at the wye point 1625 to increase or decrease. As an example, the circuitry 1650 may be configured to detect an increase, a decrease or an increase and a decrease in voltage at the wye point 1625. While FIG. 16 illustrates a particular circuit component, various types of circuits, circuit components, etc. may be used to operatively impart an unbalance in one or more phases of a multiphase cable to thereby control voltage at a wye point of a multiphase electric motor. As an example, one or more patterns may be controlled via the circuitry 1630, which may include command patterns, instruction patterns, etc. As an example, a pattern may include a header, a tail, a message, etc. As an example, a pattern may be imparted using a frequency that differs from a base frequency of a multiphase electric motor (e.g., a frequency less than about 30 Hz, a frequency greater than about 90 Hz, etc.).

As an example, a method may include modulating unbalance at a wye point (e.g., a point where multiple phases of a multiphase electric motor are coupled). In such an example, the method may include transmitting information, optionally using one or more techniques (e.g., CDMA, etc.). As an example, a method may include transmitting an interrupt, for example, where unbalance initiates a handshake. As an example, an interrupt may be a header, precursor, etc., which may act to place circuitry in a listening state (e.g., listening mode) or other state.

As an example, a method may include modulating unbalance at a wye point. In such an example, circuitry coupled to a wye point may be configured to detect patterns. As an example, such circuitry may be configured to sample at a sampling rate of about 225 Hz. As an example, such sampling may be controllable, for example, to comport with intentional modulation of unbalance.

Figure 17:
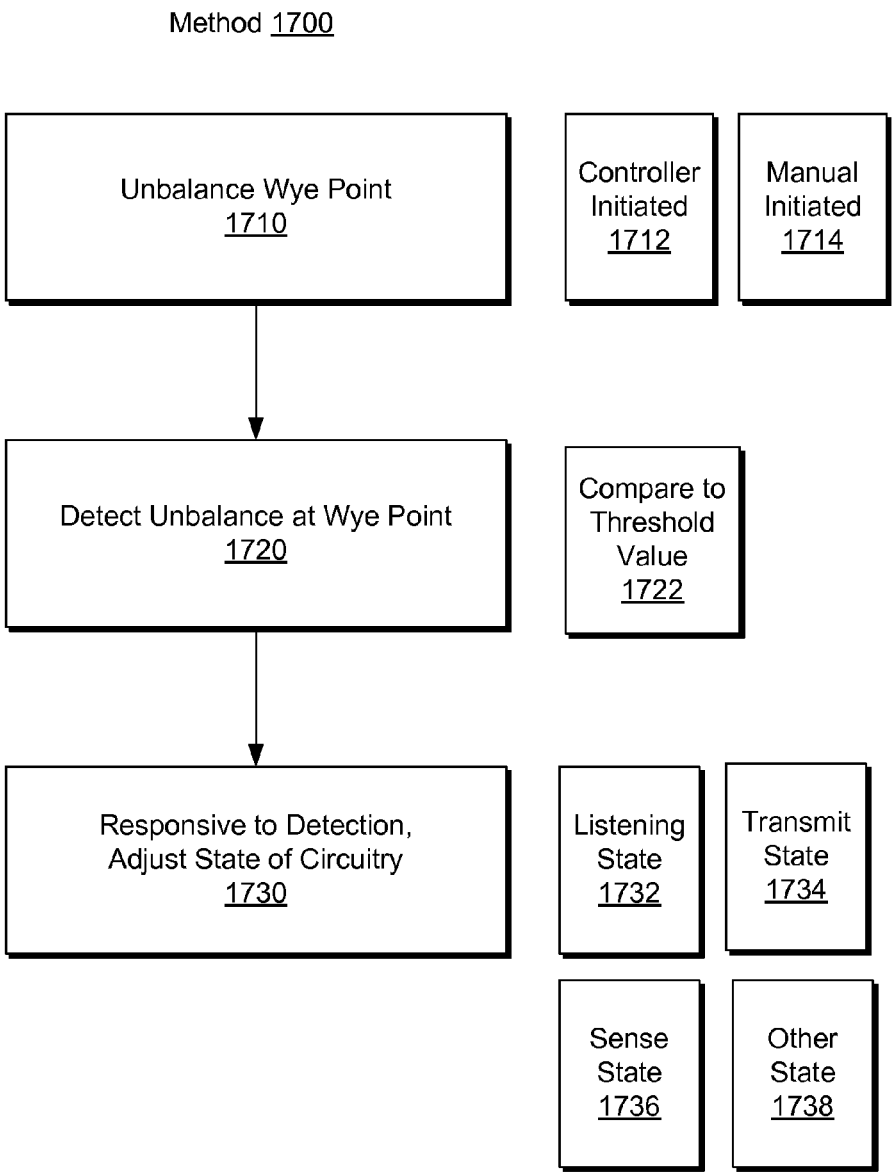
FIG. 17 illustrates an example of a method.

FIG. 17 shows an example of a method 1700 that includes an unbalance block 1710 for unbalancing a wye point, a detection block 1720 for detecting unbalance at the wye point and an adjustment block 1730 for adjusting a state of circuitry, for example, responsive to detection of unbalance at the wye point. As an example, the unbalance block 1710 may be coupled to one or more initiation blocks 1712 and 1714, for example, for initiation by a controller or manual initiation (e.g., by an operator). As an example, the detection block 1720 may be coupled to a comparison block 1722, for example, to compare a wye point voltage value to one or more threshold values. As an example, the adjustment block 1730 may be coupled to various state blocks 1732, 1734, 1736 and 1738, for example, to transition to or from a listening state, a transmission state, a sense state or one or more other states.

As an example, an electric submersible pump system can include a multiphase electric motor operatively coupled to a fluid pump where the multiphase electric motor includes a wye point; a multiphase power cable operatively coupled to the multiphase electric motor; telemetry circuitry operatively coupled to the wye point; and unbalance circuitry coupled to the telemetry circuitry and to the multiphase power cable to unbalance the wye point according to a telemetric protocol. In such an example, the telemetric protocol may specify commands that instruct the telemetry circuitry, for example, commands may include a sense command that commences sensing via a sensor operatively coupled to the telemetry circuitry, a transmit command that commences generation of telemetry signals by the telemetry circuitry, etc.

Figure 18:
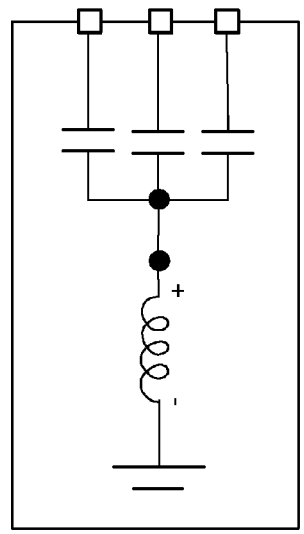
FIG. 18 illustrates an example of a tune filter.
Figure 18:
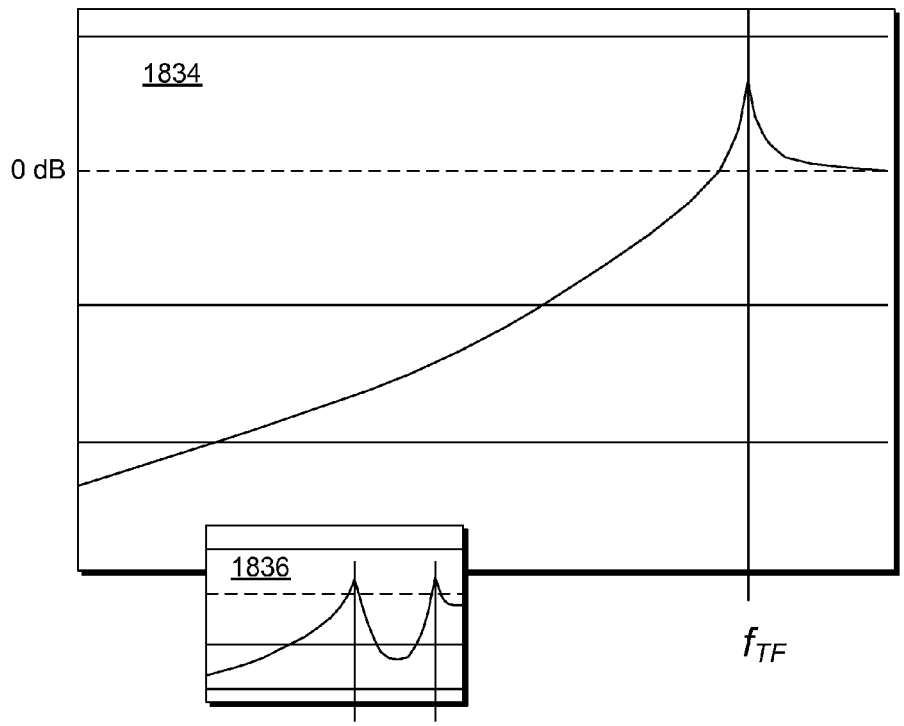
Figure 19:
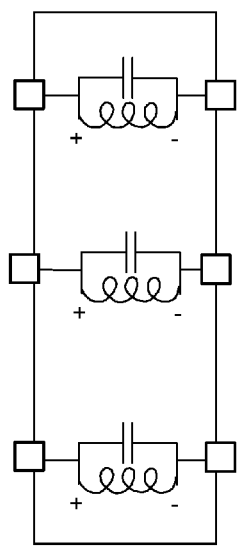
FIG. 19 illustrates an example of a line trap.
Figure 19:
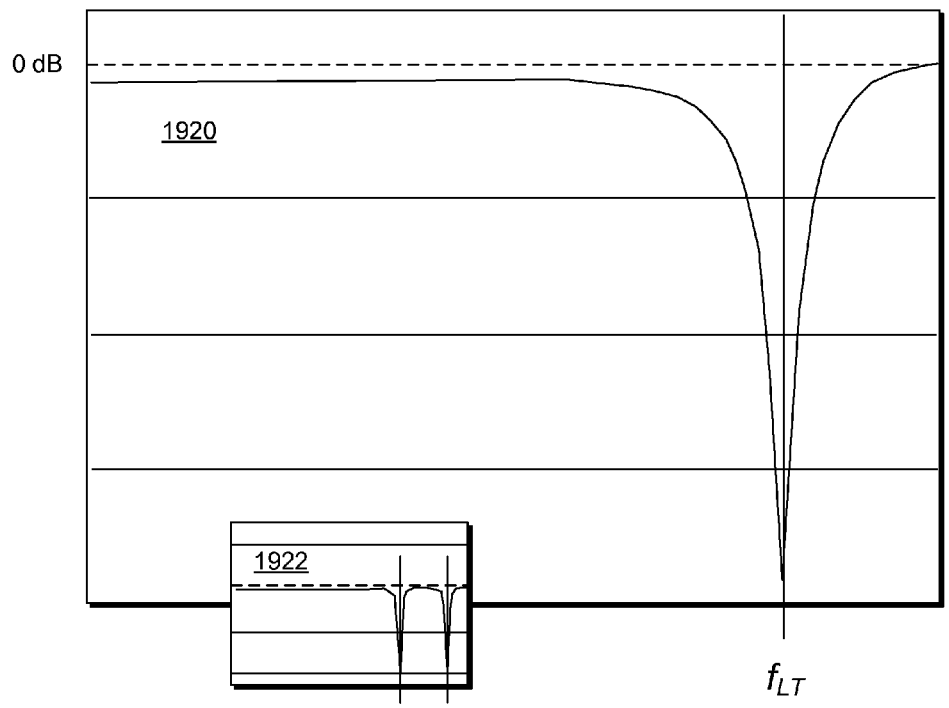
Figure 20:
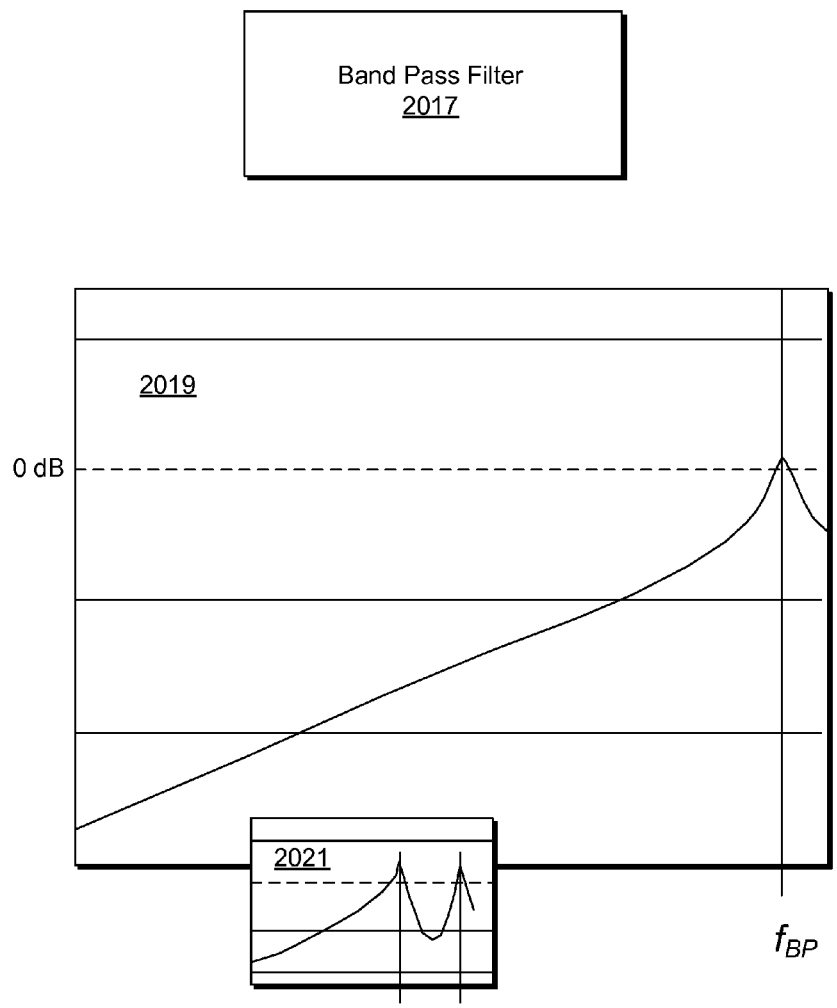
FIG. 20 illustrates an example of a band pass filter.

FIG. 18 shows an example of a tune filter 1832 along with a frequency response plot 1834 (e.g., gain versus log frequency) and an example of a response plot 1836, for example, for one or more tune filters that may be configured with respect to multiple tune frequencies (e.g., multiple peak pass frequencies). FIG. 19 shows an example of a line trap 1916 along with a frequency response plot 1920 (e.g., gain versus log frequency) and an example of a response plot 1922, for example, for one or more line traps that may be configured with respect to multiple line trap frequencies (e.g., multiple valley trap frequencies). FIG. 20 shows an example of a band pass filter 2017 along with a frequency response plot 2019 (e.g., gain versus log frequency) and an example of a response plot 2021, for example, for one or more band pass filters that may be configured with respect to multiple pass frequencies (e.g., multiple peak band pass frequencies, which may be center frequencies for individual pass bands).

Figure 21:
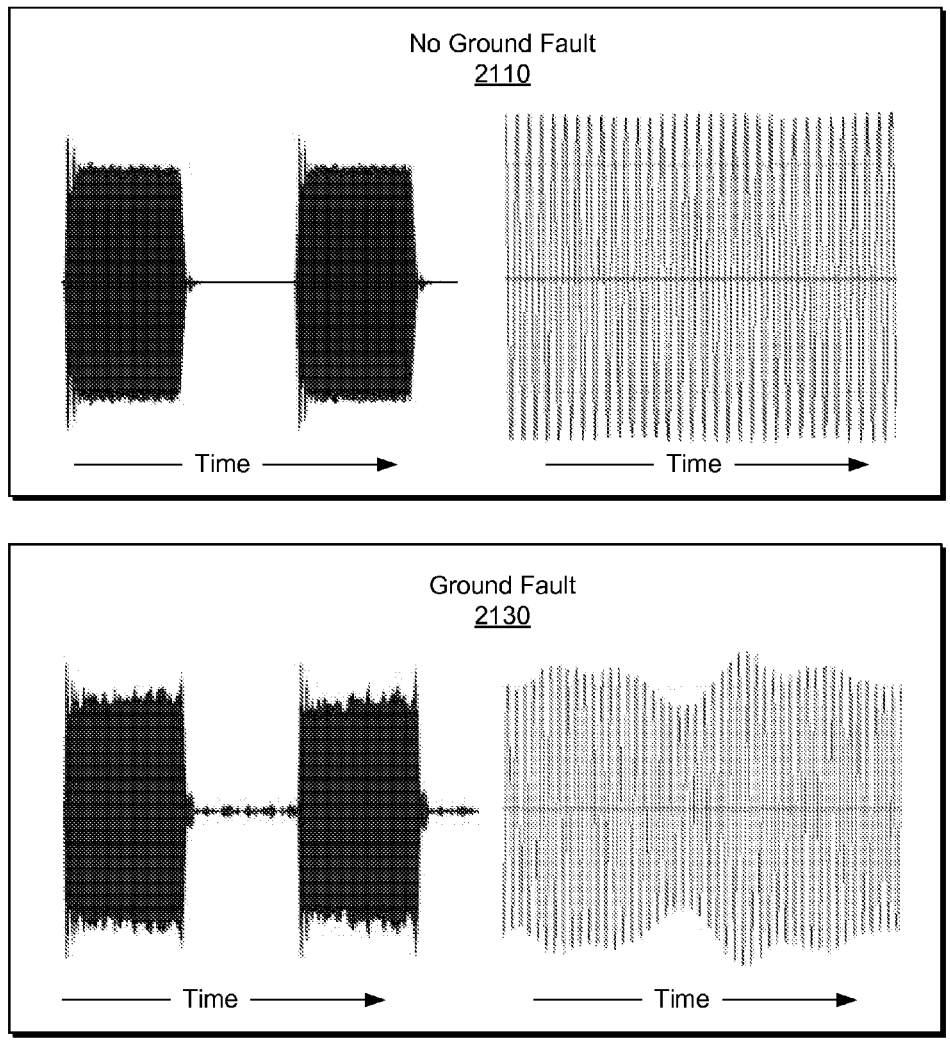
FIG. 21 illustrates examples of plots associated with telemetry.

FIG. 21 shows examples plots 2110 and 2130 of transmissions in a system that includes the tune filter 1832, the line trap 1916 and the band pass filter 2017. The plot 2110 corresponds to a no ground fault state while the plot 2130 corresponds to a ground fault state. As demonstrated, via use of components such as the tune filter 1832, the line trap 1916 and the band pass filter 2017, telemetry may be maintained in the presence of a ground fault. As an example, various components may be configured for telemetry at multiple frequencies (see, e.g., the example plots 1836, 1922 and 2021).

As an example, a system may be configured for telemetry using a frequency (e.g., a frequency of about 10 kHz or more) that may provide higher bandwidth and that may be away from ESP noise. In such a system, circuitry may be powered from DC voltage under a no ground fault state whereas in a ground fault state such circuitry may be powered by unbalance voltage at wye point of an electric motor. As an example, such circuitry may be coupled to a sensor or sensors where sensed information may be transmitted using one or more telemetric techniques (via a telemetric signal). As an example, a receiver may include a tune filter where, even in scenarios with high attenuation to a telemetric signal (e.g., due to long lengths of cable), the telemetric signal may be recovered.

As an example, a method may include operating an electric submersible pump by delivering power to an electric motor to rotate a shaft where impellers of a pump are operatively coupled to the shaft. In such an example, the method may include transmitting information using telemetry where such telemetry occurs at least in part via a power cable operatively coupled to the electric motor.

As an example, one or more control modules (e.g., for a controller such as the controller 230, the controller 250, etc.)

may be configured to control an ESP (e.g., a motor, etc.) based at least in part on information as to one or more fluid circuits in that may exist between stages of a pump. For example, one or more of backspin, sanding, flux, gas lock or other operation may be implemented in a manner that accounts for one or more fluid circuits (e.g., as provided by diffusers with fluid coupling holes). As an example, a controller may control an ESP based on one or more pressure estimations for a fluid circuit or circuits (e.g., during start up, transients, change in conditions, etc.), for example, where a fluid circuit or circuits may act to balance thrust force.

As an example, one or more methods described herein may include associated computer-readable storage media (CRM) blocks. Such blocks can include instructions suitable for execution by one or more processors (or cores) to instruct a computing device or system to perform one or more actions. As an example, equipment may include a processor (e.g., a microcontroller, etc.) and memory as a storage device for storing processor-executable instructions. In such an example, execution of the instructions may, in part, cause the equipment to perform one or more actions (e.g., for sensing, telemetry, etc.).

According to an embodiment, one or more computer-readable media may include computer-executable instructions to instruct a computing system to output information for controlling a process. For example, such instructions may provide for output to sensing process, an injection process, drilling process, an extraction process, an extrusion process, a pumping process, a heating process, etc.

Figure 22:
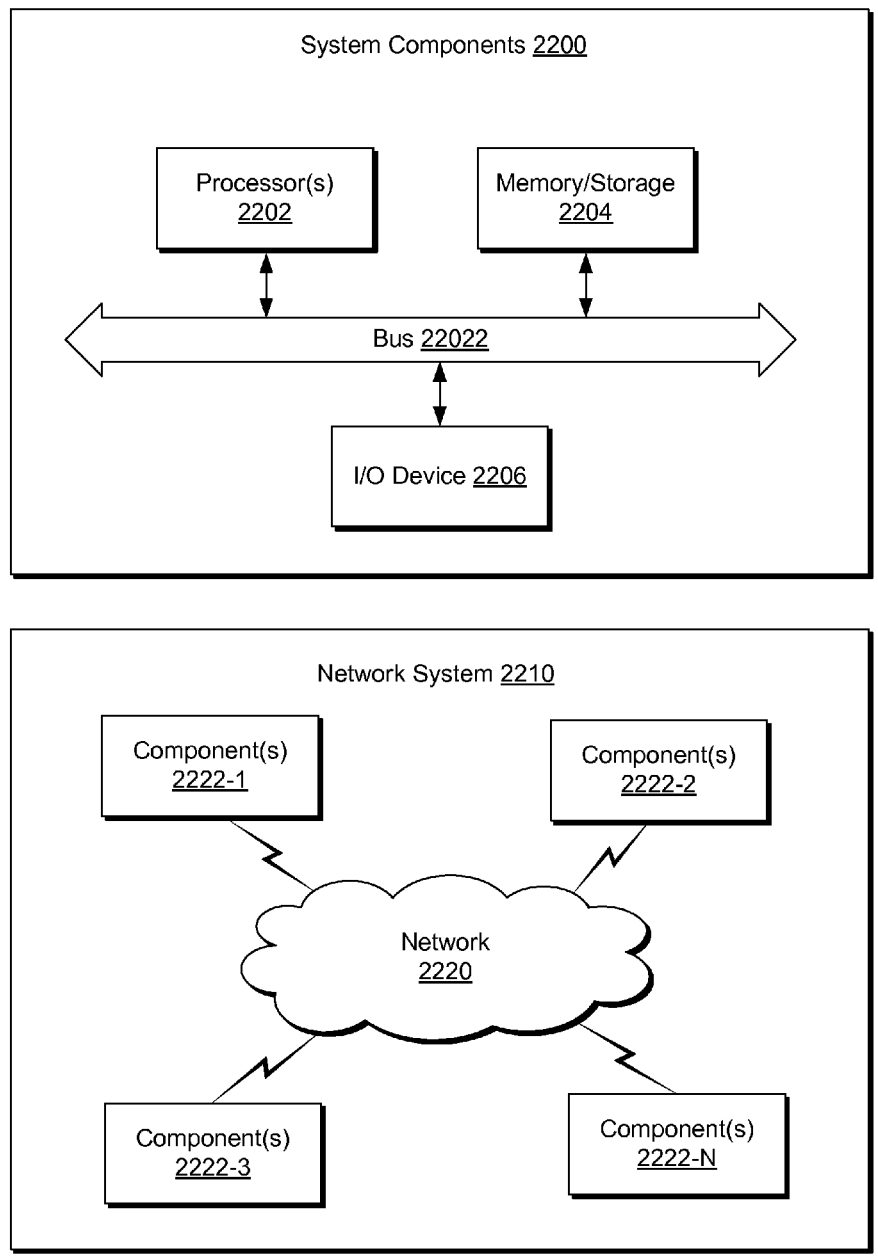
FIG. 22 illustrates example components of a system and a networked system.

FIG. 22 shows components of a computing system 2200 and a networked system 2210. The system 2200 includes one or more processors 2202, memory and/or storage components 2204, one or more input and/or output devices 2206 and a bus 2208. According to an embodiment, instructions may be stored in one or more computer-readable media (e.g., memory/storage components 2204). Such instructions may be read by one or more processors (e.g., the processor(s) 2202) via a communication bus (e.g., the bus 2208), which may be wired or wireless. The one or more processors may execute such instructions to implement (wholly or in part) one or more attributes (e.g., as part of a method). A user may view output from and interact with a process via an I/O device (e.g., the device 2206). According to an embodiment, a computer-readable medium may be a storage component such as a physical memory storage device, for example, a chip, a chip on a package, a memory card, etc.

According to an embodiment, components may be distributed, such as in the network system 2210. The network system 2210 includes components 2222-1, 2222-2, 2222-3, . . . 2222-N. For example, the components 2222-1 may include the processor(s) 802 while the component(s) 2222-3 may include memory accessible by the processor(s) 2202. Further, the component(s) 2202-2 may include an I/O device for display and optionally interaction with a method. The network may be or include the Internet, an intranet, a cellular network, a satellite network, etc.

CONCLUSION

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. An electric submersible pump system comprising:
a multiphase electric motor operatively coupled to a fluid pump wherein the multiphase motor comprises a wye point;
a plurality of downhole devices including at least one sensor, the plurality of downhole devices being coupled with the wye point via circuitry, the circuitry being configured to provide both power and AC telemetry signals to the plurality of downhole devices in both a ground fault state and a normal, non-ground fault state with respect to the wye point, the circuitry being able to reduce detrimental impact of abnormal wye point unbalance to both the power and the AC telemetry signals in the ground fault state and to reduce detrimental impact of normal wye point unbalance to both the power and the AC telemetry signals in the normal, non-ground fault state:
the circuitry comprising telemetry circuitry operatively coupled to the wye point wherein the telemetry circuitry generates AC telemetry signals;
a multiphase power cable operatively coupled to the multiphase electric motor;
a tune filter operatively coupled to the telemetry circuitry and to the multiphase power cable wherein the tune filter amplifies AC telemetry signals generated by the telemetry circuitry to form amplified AC telemetry signals and passes the amplified AC telemetry signals to the multiphase power cable via the wye point; and
a line trap filter operatively coupled to the multiphase power cable.

2. The electric submersible pump system of claim 1 wherein the tune filter comprises a peak pass frequency, the peak pass frequency being associated with a telemetry frequency for the AC telemetry signals.

3. The electric submersible pump system of claim 2 wherein the tune filter comprises multiple peak pass frequencies, each of the peak pass frequencies being associated with a respective telemetry frequency of multiple telemetry frequencies for the AC telemetry signals.

4. The electric submersible pump system of claim 1 wherein the line trap comprises a valley trap frequency for attenuating noise generated by a power drive operatively coupled to the multiphase power cable.

5. The electric submersible pump system of claim 4 wherein the valley trap frequency is associated with a telemetry frequency for the AC telemetry signals.

6. The electric submersible pump system of claim 1 wherein the line trap comprises an impedance selected to exceed a ground impedance associated with a power drive in a ground fault state, the power drive being operatively coupled to the multiphase power cable.

7. The electric submersible pump system of claim 1 wherein the line trap comprises a trap function that attenuates noise associated with a power drive operatively coupled to the multiphase power cable and a high impedance function that exceeds a ground impedance of the power drive for a ground fault state of the multiphase power cable.

8. The electric submersible pump system of claim 1 wherein the telemetry circuitry comprises a frequency for the AC telemetry signals that exceeds 10 kHz.

9. The electric submersible pump system of claim 1 comprising a band pass filter that comprises a frequency pass band that comprises a telemetry frequency for the AC telemetry signals.

10. The electric submersible pump system of claim 1 wherein the telemetry circuitry comprises a tuned LC circuit electrically coupled to the wye point and to a telemetry driver.

11. The electric submersible pump system of claim 1 wherein the telemetry circuitry comprises a voltage divider that comprises a tuned LC circuit electrically coupled to the wye point and to a telemetry driver wherein the tuned LC circuit passes the AC telemetry signals and acts to limit voltage experienced by the telemetry driver in a ground fault state of the wye point.

12. An electric submersible pump system comprising:
a multiphase electric motor operatively coupled to a fluid pump wherein the multiphase motor comprises a wye point;
a multiphase power cable operatively coupled to the multiphase electric motor;
a plurality of downhole sensors, the plurality of downhole sensors being coupled with the wye point via circuitry, the circuitry being configured to provide both power and AC telemetry signals to the plurality of downhole devices in both a ground fault state and a normal non-ground fault state with respect to the wye point, the circuitry being able to reduce detrimental impact of abnormal wye point unbalance to both the power and the AC telemetry signals in the ground fault state and to reduce detrimental impact of normal wye point unbalance to both the power and the AC telemetry signals in the normal non-ground fault state;
a tune filter operatively coupled to the multiphase power cable wherein the tune filter amplifies a frequency band of signals to form an amplified frequency band of signals and pass the amplified frequency band of signals to the multiphase power cable via the wye point; and
a line trap operatively coupled to the multiphase power cable wherein the line trap attenuates noise in the frequency band of signals and wherein the line trap filter comprises an impedance that mitigates loss of the frequency band of signals for the ground fault state of the system.

13. The electric submersible pump system of claim 12 further comprising telemetry circuitry operatively coupled to the wye point wherein the telemetry circuitry generates the frequency band of signals.

14. The electric submersible pump system of claim 13 wherein the telemetry circuitry drives power via the wye point.

15. The electric submersible pump system of claim 12 further comprising the fluid pump.

* * * * *